United States Patent
Sanchez

(10) Patent No.: US 11,590,056 B2
(45) Date of Patent: Feb. 28, 2023

(54) FREEZE/THAW CONTAINMENT SYSTEM FOR FLEXIBLE POUCH FILLED WITH BIOPHARMACEUTICAL FLUID, AND METHOD OF ASSEMBLING A FREEZE/THAW CONTAINMENT SYSTEM, USING A PROTECTING BODY

(71) Applicant: SARTORIUS STEDIM NORTH AMERICA, Bohemia, NY (US)

(72) Inventor: Marc Sanchez, Brooklyn, NY (US)

(73) Assignee: SARTORIUS STEDIM NORTH AMERICA, Bohemia, NY (US)

( * ) Notice: Subject to any disclaimer, the term of this patent is extended or adjusted under 35 U.S.C. 154(b) by 316 days.

(21) Appl. No.: 16/943,688

(22) Filed: Jul. 30, 2020

(65) Prior Publication Data

US 2022/0031568 A1  Feb. 3, 2022

(51) Int. Cl.
*A61J 1/16* (2006.01)
*A61J 1/14* (2006.01)
*A61J 1/10* (2006.01)
*B65B 5/04* (2006.01)

(52) U.S. Cl.
CPC ... *A61J 1/16* (2013.01); *A61J 1/10* (2013.01); *A61J 1/1468* (2015.05); *A61J 1/1475* (2013.01); *B65B 5/04* (2013.01)

(58) Field of Classification Search
CPC .... A61J 1/16; A61J 1/1468; A61J 1/10; A61J 1/1475; B65B 5/04; A61B 50/00; A61B 50/30
See application file for complete search history.

(56) References Cited

U.S. PATENT DOCUMENTS

| 11,253,430 | B2 * | 2/2022 | Cutting | A01N 1/0252 |
| 2012/0152943 | A1 | 6/2012 | Leoncavallo et al. | |
| 2018/0125754 | A1 * | 5/2018 | Sanchez | B65D 61/00 |
| 2018/0125757 | A1 * | 5/2018 | Sanchez | A61J 1/16 |
| 2018/0128707 | A1 * | 5/2018 | Sanchez | G01M 3/3218 |
| 2019/0125628 | A1 * | 5/2019 | Sanchez | A61J 1/10 |

(Continued)

FOREIGN PATENT DOCUMENTS

| EP | 2 322 442 | 5/2011 | | |
| EP | 2240012 B1 * | 10/2015 | | A01N 1/02 |

(Continued)

*Primary Examiner* — Rafael A Ortiz
(74) *Attorney, Agent, or Firm* — Nixon & Vanderhye

(57) ABSTRACT

A freeze/thaw containment system is provided, having a protecting body and a flexible pouch, of a first capacity, protected by two plates of the protecting body. The two plates are attached together at a peripheral margin and form a rectangular protecting body. The peripheral margin is mounted in a stationary frame and allowed to be displaced inwardly during filling of the pouch, while the protecting body extends generally planar to sandwich and constrain the pouch. One amongst the stationary frame and the protecting body includes fastening members for attachment of a casing configured for storing the bag, in order to have the bag fastened parallel to the protecting body. Two fasteners for cooperating with the fastening members are distributed around a bag containing part of a second capacity at least ten times inferior to the first capacity. Same biopharmaceutical composition is contained in the pouch and in the bag.

20 Claims, 11 Drawing Sheets

(56) References Cited

U.S. PATENT DOCUMENTS

2020/0107993 A1* 4/2020 Cutting ................ A01N 1/0252
2020/0253823 A1* 8/2020 Wu ..................... A61M 5/1413
2021/0145695 A1* 5/2021 Sanchez ................ A61J 1/1475

FOREIGN PATENT DOCUMENTS

NO          03/037082 A1     5/2003
WO    WO-2017132543 A1 * 8/2017 ................ A61J 1/10

* cited by examiner

FREEZE/THAW CONTAINMENT SYSTEM FOR FLEXIBLE POUCH FILLED WITH BIOPHARMACEUTICAL FLUID, AND METHOD OF ASSEMBLING A FREEZE/THAW CONTAINMENT SYSTEM, USING A PROTECTING BODY

BACKGROUND OF THE INVENTION

Field of the Invention

The present invention generally relates to the protection of a flexible pouch specially designed to contain a biopharmaceutical fluid and more broadly to a system for containing a biopharmaceutical fluid. The invention also relates to methods for manufacturing/assembling such a system that is adapted for freezing and thawing the biopharmaceutical fluid within the system. A biopharmaceutical fluid means a biotechnological derived fluid, for example a fluid derived from a culture medium, a cell culture, a buffer solution, an artificial nutrition liquid, a blood fraction, a blood derived component or a pharmaceutical fluid or, more broadly, a fluid specifically designed to be used in the medical field. Of course, the fluid may become solid or partly solid after freezing (typically at a temperature much lower than 0° C.).

DESCRIPTION OF RELATED ART

It is known to use a flexible pouch to contain biopharmaceutical fluid. The flexible pouch is able to withstand low mechanical stress without damage. Hence, the leakage risk is reduced. Moreover, the flexible pouch is advantageous since it can be folded or stored flat when there is no biopharmaceutical fluid inside. Hence, the flexible pouch occupies a small volume.

The flexible pouch is generally designed for a single use and to contain a biopharmaceutical fluid volume which is between 1 liter and 500 liters.

However, specifically for shipping of the flexible pouch filled with fluid, for example, between several plant areas or from the provider of the fluid to its client which will use it, but also for storage, the flexible pouch must be protected, although the leakage risk is small.

The document EP-2 322 442 discloses a container for a flexible pouch. The container comprises a lower part and an upper part which are rigid and joined along a common edge and which form a single piece container. The container has a volume which is much more important than the volume of the flexible pouch. Consequently, the container has a useless volume. Moreover, if the flexible pouch is not retained by suitable positioning means provided in the container, it could be moved within the container, especially during shipping. Thus, the leakage risk increases.

Single-use polymeric containers, hereafter called bags or pouches, are successfully used for the storage of biopharmaceuticals in liquid state. Today, bags made of ethylene vinyl acetate (EVA) or low-density polyethylene (LDPE) have been found suitable for the storage and shipping of biological bulks at ambient or cold temperature (2 to 8° C.). However, problems exist in freezing applications with bags as currently configured. At low temperatures, the physical properties of plastic materials may change sufficiently to introduce brittleness that can reduce the capacity of the bag to absorb external forces, i.e., shocks without fracturing. In addition, ice volumetric expansion can cause significant mechanical stress leading to bag, port, tubing, or connector breakage. It is well known that current commercially available unprotected bags do not adequately protect frozen products.

To eliminate problems related to bag breakage, Sartorius Stedim Biotech has developed the Celsius™ FFT concept (FFT for "Flexible Freeze and Thaw"), which combines a flexible pouch with a semi-rigid protective shell. The contribution of the protective shell is predominant in the absorption of stresses resulting from processing or handling conditions.

Document US 2018/125757 provides a protecting body, so that the flexible pouch is sandwiched by the two plates of the protecting body, with a constraining effect. A freeze/thaw protection system may be obtained, by combining a single-use flexible container wrapped by such a protecting body and a protective shell. However, uniform fluid distribution may be difficult because, in a filled state of the flexible container, a significant bulge (big belly) in the middle is formed. In frozen state, ice expansion is thus relatively significant and more time will be needed to freeze this big mass in the middle of the interior volume of the pouch.

Besides, for a flexible container of large capacity, it would be of interest to obtain/use a small volume of the product contained in the pouch, without complex operations and without causing an increase in the bulk of the system.

SUMMARY OF THE INVENTION

The purpose of the present invention is to provide a storage unit for obtaining a robust freeze/thaw containment and protection system efficient for conditioning a large amount of biopharmaceutical material in a flexible pouch (typically a 2D-pouch than inflates in a filled state) of flexible design, while also allowing using all or part of the system as a backing/supporting part for enhanced integration of functionalities, making the system user-friendly.

To this end, embodiments of the present invention provide a freeze/thaw containment system for containing a biopharmaceutical composition, comprising:

- a flexible pouch of a first capacity, configured to contain the biopharmaceutical composition;
- a storage unit for use in freezing, storing and thawing the biopharmaceutical composition contained in the flexible pouch;
- a bag of a second capacity, configured to contain a composition representative of the biopharmaceutical composition, the second capacity being lower than the first capacity; and
- a casing delimiting an inside volume for housing the bag in a filled state of the bag; wherein the storage unit comprises:
- a protecting body comprising two plates for protecting the flexible pouch, the protecting body comprising a longitudinal axis and having four sides, the four sides comprising two longitudinal sides extending parallel to the longitudinal axis and two other sides that include a first end side and a second end side each perpendicular to the longitudinal axis, and
- an attachment device for fastening the two plates so that in an assembled state of the two plates, the protecting body comprises a peripheral margin that extends annularly in a protecting body reference plane,
- wherein the system further comprises a rigid peripheral part, adjacent to or overlapping the peripheral margin, provided with a mounting set comprising three separate supporting members for supporting the protecting body, wherein in the assembled state:
the protecting body extends planar in an empty state of the flexible pouch, along the protecting body reference plane;
the two plates respectively form (i.e. include) a lower surface and an upper surface of the protecting body, at least one amongst the lower surface and the upper surface being a storage unit outer surface;
and wherein the casing comprises at least two fastening elements cooperating with fastening members provided/included in one amongst the mounting set and the storage unit outer surface, in order to have the casing fastened along the storage unit, parallel to the protecting body.

A sample is thus readily available, thanks to the sample unit or bag. The bag may be easily affixed to the protecting body thanks to a removable fixture, the casing being typically extending along the storage unit outer surface and away from a middle part of the protecting body. This is of interest to improve compactness as, when the flexible pouch contains more than 50 or 75 L, the thickness can be significantly greater in such middle part as compared to thickness near a circumferential part of the protecting body. If needed, the bag may also be kept affixed to the protecting body during transportation, in freezing/thawing operations, without increasing the bulk of the system in filled state of the pouch.

The bag is advantageously protected by the casing if the system has to be transported (possibly transported while the biopharmaceutical composition is frozen). A sample unit is thus formed, offering a way to quickly analyze or test the composition, since the content of small bag is much faster to be thawed and retrieved at a homogenous positive temperature, as compared to the content of the pouch that has a comparatively larger capacity.

The bag and the storage unit are supported together by the supporting members, which define all or part of the peripheral rigid part.

Typically, the casing may extend above the storage unit outer surface formed by the upper plate of the two plates, possibly without any contact between the casing and the protecting body. Optionally, all the fastening members are provided in the mounting set, preferably entirely above the protecting body.

The storage unit can simultaneously have an expansible part for expansion along a vertical direction (Z direction) as a function of the filling of the pouch, and a rigid sliding part (fixed not displaceable along Z direction) formed as an interface for insertion in a frame, typically an annular frame, or any similar part surrounding the pouch and cooperating with the peripheral margin of the protecting body. The expansible part is composed of the protecting body (following expansion of the pouch, typically with a constraining effect limiting vertical extension of such expansion), According to another option, the casing may be in contact (in direct contact) with the storage unit outer surface, possibly without use of intermediate fastening device or intermediate adhesive layer. One of the plates is holding the casing, so that the protecting body acts as a backing assembly for the casing.

The bag may be configured to contain same composition as the composition in the flexible pouch, in order to form a sample.

The peripheral margin may be provided with at least one opening able to receive at least one port of the flexible pouch. This of interest to permit filling or emptying of the pouch. The openings or ports may be formed as closable tubes, for example, and may be provided between facing parts of a welded joint where two constitutive sheets of the pouch are joined. Such openings may be of interest, to allow the pouch to be filled or emptied.

Optionally, two of the fastening members are formed integrally with two separate corner sections, in order to be distributed on a frame around the flexible pouch. With such arrangement, the bag can be stored near an end part of the system, without having the fastening members interfering with location of tube(s) that can be connected to the pouch. Typically, the corner sections having the fastening members are away from any opened side of the peripheral margin.

The peripheral part may be a frame with four corner sections interconnecting frame profiles, the peripheral margin having only one opened side that is located between two corner sections, which are at the end opposite from the end having the two corner sections provided with the fastening members for the fastening of the casing.

According to an embodiment, the two plates are flexible enough to allow the protecting body to have a thickness in a central area greater than in a circumferential area, in reference to the protection body reference plane, the thickness being measured between the lower surface and the upper surface along a direction perpendicular to the protection body reference plane.

According to an embodiment, the flexible pouch is directly sandwiched between the two plates which constrain the flexible pouch. The flexible pouch is typically more flexible than material of the protecting body. The constraining effect is of interest for a step of emptying the flexible pouch, and is advantageous to limit expansion of the fluid (vertical expansion when the protecting body extends generally horizontal so that the protecting body reference plane extends substantially horizontal), especially during freezing.

The casing may be made of plastic material more rigid than plastic material of the flexible pouch.

The two plates may constrain the flexible pouch by a respective covering portion that extends between two margin portions of the peripheral margin.

Typically, the protecting body is mounted to cover the two main opposite faces of the flexible pouch, and acts as an expansion guiding element adapted to deploy in volume in an expanded state, so that the assembly composed of the protecting body and the flexible pouch covered by the protecting body can fill an inner cavity delimited by or an interspace delimited between the two protecting parts, without bulging too much in a covering part middle portion provided at equal distance from front and rear edges of the flexible pouch and separating two other complementary parts of same longitudinal size as a determined longitudinal size of the middle portion (the determined size thus being substantially equal to one third of the longitudinal size of the flexible pouch as the covering portion has same length as the flexible pouch).

Optionally, several protecting body through-slots are provided and longitudinally distributed in each of the two opposite margin portions.

The attachment device may interact with some of the protecting body through-slots or may be distributed in alternate locations relative to the protecting body through-slots.

In some embodiments, each of the two plates comprise embossments, which define, in assembled state of the plates to form the protecting body, several protecting body embossments protruding in a first direction perpendicular to the protection body reference plane, forming corresponding cavities opening in a second direction opposite to the first direction, the embossments being longitudinally distributed in the peripheral margin.

A number of the embossments may be provided in one of the two plates and engaged in a same number of the corresponding cavities provided in the other one of the two plates.

Independently from having or not a bag hold by the protecting body or by a frame or similar peripheral part (possibly via a casing), the system may comprise:
- a tube connected to the flexible pouch and configured for flowing liquid of the biopharmaceutical composition;
- a frame provided with four sides, forming a rigid peripheral part of the system and extending parallel to the protecting body reference plane, at least two profiles included in the frame forming all or part of the four sides, the four sides being preferably formed by four profiles; and
- a tubing holder for holding the tube, the tubing holder comprising at least one fixing element resiliently mounted on one of the profiles and provided with a clamping part for holding the tube.

Typically, the frame intersects the protecting body reference plane and extends parallel to the protecting body reference plane, the frame being configured to hold/support the protecting body, directly or indirectly.

In some embodiments, the tube is forming a port of the flexible pouch. Besides, the tubing holder may be distributed in two locations, with two separate and spaced fixing elements.

In some embodiments, the at least one fixing element is provided with one of the fastening members (for the sample unit), which is adjacent to and/or superimposed on the clamping part.

In variants, one of the four sides is suppressed so that the frame comprises three profiles extending parallel to the protecting body reference plane.

The fixing element may have U or C-shaped section, with an interior face, for engaging three faces of a profile (receiving profile) that is part of the frame. The clamping part may be separate from the U or C-shaped section. The clamping part may be formed on the outer face of the fixing element, and possibly defines a C-shaped receiving part, which is:
- protruding from the exterior face of the bracket (fixing element),
- and/or facing at the opposite from the receiving profile.

In various embodiments of the system, recourse may optionally also be had to one or more of the following dispositions:
- the two plates are two pieces.
- the two plates may have a same thickness that is lower than 2 mm, each of the two plates having a density superior to 1.10 g/cm$^3$ and being made of plastic material.
- the two plates are made of same plastic material, preferably transparent or translucent
- the protecting body is made of a freeze resistant polyester or copolyester material that is not brittle at about 25° F. or −4° C.
- the material of the protecting body is PET.
- the material of the protecting body is TRITAN (i.e. a copolyester compound called TRITAN™, which is a transparent amorphous thermoplastic material, typically made by combining three monomers; some formulations of this material do not contain additives, while others contain about or less than 10% additives).
- the material of the protecting body is an amorphous copolyester made by combining the following monomers: dimethyl terephthalate, 2,2,4,4-tetramethyl-1,3-cyclobutanediol, and 1,4-cyclohexanedimethanol.
- the protecting body is directly engaged by positioning members that belong to the attachment device, in order to have a profile of shrink at the protecting body circumference, with possibly almost no reduction or less shrink due to direct engagements of the positioning members engaged in a middle region of the protecting body, at the margin portions.
- the positioning members are distributed around the covering portion.
- the holding and retaining device has two separate protecting parts that are interlocked by the positioning members, in order to have the protecting body sandwiched between the two protecting parts and arranged in the interspace that is delimited by the two protecting parts.
- the holding and retaining device comprises profiles, for instance with U-shape or C-shape section, each delimiting an internal cavity, the positioning members being each arranged inside one of the respective cavities of the holding and retaining device, in order to have the positioning members selectively movable inwardly according to a stroke that depends on an interspace provided inside a cavity, the positing members acting as stoppers for limiting expansion of the protecting body when an abutment surface that belongs to a given positioning member abuts against an abutment edge or abutment face of the profile housing the given positioning member.
- each of the positioning members is engaged to extend through one of the two opposite margin portions, by extending through at least one cut or recess formed in one of the two margin portions.
- the protecting body plane intersects four margin portions distributed in a rectangular shape and each in contact with the two protecting parts of the shell, the four margin portions being arranged around the covering portion, the two opposite margin portions being part of this group of four margin portions. In various embodiments, the system may be provided with one or more of the following features:
- the fastening members are distributed in different (spaced) regions.
- the fastening members are distributed in a first region adjacent to a first side of the two longitudinal sides of the protecting body, and in at least one second region located away from the first side.
- the casing is removably secured to the peripheral part (frame).
- the peripheral part comprises covering parts covering the peripheral margin, the fastening members being formed as coupling pieces of the mounting set and being interposed between:
- profiles or similar rigid components/supporting members (for supporting the protecting body) of the peripheral part, and the fastening elements of the casing.
- the rigid peripheral part is a frame having a top face extending above the protecting body and a lower face extending below the protecting body.
- the casing is removably secured to the protecting body.
- the casing is removably secured to the mounting set, the mounting set extending around three sides of the flexible pouch.

the fastening members comprise two fastening members, distributed on the two longitudinal sides, the two fastening members extending entirely above the protecting body and away from the two other sides.

the fastening members comprise at least one fastening member integrally formed with one of the three separate supporting members or with a corner section interconnecting two of the three separate supporting members.

the casing is affixed to the storage unit outer surface by one or more snap buttons.

the fastening members, distributed on a frame that includes the three separate supporting members, are configured for interlocking of the casing.

the fastening members, provided on the storage unit outer face, are configured for interlocking of the casing.

the interlocking of the casing may be obtained by a positive locking of male projections in a corresponding recess, like snap-buttons or similar protruding members for positive locking in a corresponding recess.

at least one of the male projections may be formed/included in one of the supporting members.

at least one of the recesses may be formed/included in one of the supporting members.

at least one of the recesses may be formed/included directly in one of the two plates, i.e. without any additional material covering a constitutive layer of the plate (if such recess opens inwardly, an outer protruding member may be created; conversely, if such recess opens outwardly, an outer protruding member may be created).

the casing is typically secured to the storage unit outer face or to the mounting set without any adhesive layer or any adhesive means.

the casing is made of at least one piece entirely separate from the protecting body and from the frame forming the rigid peripheral part, so that the casing is entirely removable away from the protecting body.

the casing has a prismatic shape.

the casing has a parallelepiped shape.

the casing is provided with a casing frame delimiting a casing opening for access to the inside volume of the casing.

the casing has a lid configured to close in removable manner the casing opening (the lid partly delimiting the inside volume).

in the protecting body, the two other sides are short sides of the protecting body as compared to the longitudinal sides.

the casing is elongated in a direction parallel to the two short sides of the storage unit (when secured to the peripheral part and/or to the protecting body).

each of two plates is a plate having a rectangular shape with four corners and two virtual diagonal lines each intersecting a pair of corner vertices of the four corners.

the side wall of the casing is intersected by only one of the two virtual diagonal lines and is arranged away from a middle part of the protecting body.

the side wall may be entirely arranged in an interspace delimited by two segments of the two virtual diagonal lines, without being intersected by any one of the two virtual diagonal lines.

the thickness (or height) of the casing is inferior to 50 or 60 mm, such thickness or height being typically measured between a bottom wall and the lid of the casing.

the casing has a length that may be lower than the width of the protecting body, and may be comprised between 200 mm and 1200 mm, for example between 320 mm and 950 mm.

the bag is part of a bag unit that includes one or more openings or ports.

at least one of the opening ports is formed as closable tube to allow the bag to be filled or emptied.

the bag and each closable tube are stored in the inside volume of the casing.

the bag unit is housed in the inside volume, in a closed state of the lid.

the casing has a lower face which is facing the storage unit outer surface, and which extends parallel to the protecting body reference plane in an empty state of the flexible pouch.

the casing has a contact face that is in contact with the storage unit outer surface (when the casing is secured to the peripheral part and/or to the protecting body).

the contact face may extend parallel to the protecting body reference plane in an empty state of the flexible pouch.

the casing fastened along the storage unit has a smaller size corresponding to a casing thickness, measured perpendicular to the protecting body reference plane, the casing thickness being inferior to distance between the bag and the protecting body reference plane.

the supporting members are also supporting a tube connected to the port (the tube being typically an integral part of the pouch), preferably to have the tube extending between the peripheral part and the bag.

the casing is made of one piece of transparent plastic material.

the lid of the casing is a hinged lid.

the casing is provided with a hinged lid that is movable relative to an annular frame delimiting a casing opening for access to the inside volume.

the lid extends planar, parallel to the body reference plane.

the hinged lid is rotatable around a linear hinge.

the fastening elements comprise at least one tab formed as an extension from a side wall of the casing, at the opposite from the linear hinge.

the bag may include two plastic sheets (of liquid impervious material) bonded together to form the bag.

the bag has two sheets welded one to each other, the two sheets each having an inner face for direct contact with the composition contained in the bag.

the two sheets may be made of transparent plastic material suitable for contact with the biopharmaceutical composition.

the casing comprises a side wall delimiting the inside volume.

the casing further comprises two opposite tabs that have each a base connected to the side wall, each of the two opposite tabs being part of the fastening elements.

the storage unit comprises a sliding part supported by the peripheral margin and formed as an interface with the holding and retaining assembly, the sliding part including positioning members, which are engaged in and/or sandwich the peripheral margin, while the holding and retaining assembly includes two longitudinal covering parts each extending parallel to the protecting body reference plane.

the interface with the holding and retaining assembly prevents the four protecting body margin portions from sliding inwardly (toward a middle part thereof), beyond a stop part or rim (forming at least one abutment surface) of the holding and retaining assembly.

the two plates are configured to sandwich the flexible pouch for constraining the flexible pouch in a filled state of the flexible pouch, the protecting body being deformable and being movable in two interspaces delimited respectively by the two longitudinal covering parts of the holding and retaining assembly, to allow the two plates moving, extending, and shrinking in a transverse direction belonging to the protecting body reference plane.

According to particular feature, at least one of the two plates is provided with ribs protruding outwardly to locally structure the protecting body, at least in peripheral regions around a middle part of the protecting body, and wherein all or part of the fastening elements are in contact with the storage unit outer surface:

at a region included in one of the ribs, and at a distance from the middle part.

In some variants, the fastening elements are all provided outside the rib.

According to another aspect, the freeze/thaw containment system for containing a biopharmaceutical composition, has the two plates respectively forming a first surface and a second surface of the protecting body, at least one amongst the first surface and the second surface being a storage unit outer surface (the storage unit outer surface being formed in overlapping configuration relative to a receiving portion of the flexible pouch for receiving the biopharmaceutical composition), one amongst the storage unit outer surface and a mounting set covering the peripheral margin of the protecting body being provided with fastening members arranged above the protecting body reference plane and facing upwardly and;

wherein at least one amongst a bag and a casing configured for storing the bag is provided with at least one fastening element cooperating with the fastening members, in order to have the bag fastened parallel to the storage unit, the at least one fastening element being arranged or distributed around a containing part of the bag.

The at least one fastening element may comprise two or more fastening elements distributed around the containing part, which defines the second capacity (lower than the first capacity).

In some embodiments, the bag is provided with the fastening elements and is directly attached to the fastening members of the storage unit surface (so that the bag is attached without being stored in a casing). Typically, the bag may be provided with at least two fastening elements cooperating with the fastening members, in order to have the bag fastened to the protecting body.

In some embodiments, the two fastening elements are integral with the containing part of bag.

In some embodiments, the two fastening elements are removably attached to the containing part of bag.

In some embodiments, the two fastening elements are irremovably attached to the containing part of bag.

The containing part of the bag may be formed of only two sheets of plastic material, typically of transparent plastic material.

The fastening elements extend beyond an annular weld seam separating the containing part from peripheral parts of the bag.

At least one tube for filling and/or emptying the containing part belongs to the peripheral parts of the bag.

The bag is provided with a plurality of fastening elements, at least one of which is maintaining a tube of the bag along the protecting bag in a predefined position, when fixed to one of the fastening members or when fixed to an auxiliary attachment device of the storage unit.

According to another aspect, a method is provided for assembling a freeze/thaw containment system according to the invention, which is a protection system for storing and withstanding freezing and thawing of the biopharmaceutical composition contained in the flexible pouch of the freeze/thaw containment system.

The method comprises:

sandwiching a flexible pouch between two plates of a protecting body, selectively by a covering portion distributed in the two plates for covering the flexible pouch, the flexible pouch being of a first capacity, the protecting body being configured for protecting the flexible pouch and comprising the two plates, the protecting body further having a longitudinal axis and comprising four sides, the four sides comprising two longitudinal sides extending parallel to the longitudinal axis and two other sides that include a first end side and a second end side each perpendicular to the longitudinal axis;

using an attachment device for fastening the two plates so that in an assembled state of the two plates, the protecting body comprising a peripheral margin that extends annularly in a protecting body reference plane, around the covering portion, the peripheral margin being provided with at least one opening receiving at least one port of the flexible pouch; and providing a casing delimiting an inside volume, a bag in a filled state extending in the inside volume, the bag being of a second capacity and containing a composition representative of the biopharmaceutical composition, the second capacity being lower than the first capacity, wherein the casing has at least two fastening elements cooperating with complementary fastening members provided on a protecting body outer surface, in order to have the casing maintained and secured to the protecting body. Typically, the protecting body and the attachment device belong to a storage unit. The assembled state is obtained after configuring the two plates to sandwich the flexible pouch and after affixing the casing to fastening members that belong either to a rigid peripheral part surrounding the protecting body, or to a storage unit outer surface formed by the protecting body.

In the assembled state, the two plates respectively form a lower surface and an upper surface of the protecting body, at least one amongst the lower surface and the upper surface being the storage unit outer surface, the casing facing the storage unit outer surface and having at least two fastening elements cooperating with the fastening members, in order to have the casing maintained and secured along the storage unit, parallel to the protecting body.

In some embodiments, the fastening region extends at a distance of a circumferential area where the attachment device may extend, which is of interest for having a compact solution.

The storage unit may be supported by a rigid outer frame surrounding a circumference of the protecting body and/or a circumference of the flexible pouch, the outer frame defining an external perimeter of the system. The casing may entirely extend within the limits of a perimeter of the rigid outer frame. The casing may extend above the protecting body and between two elongated profiles that belong to the frame, optionally without any contact of a containing part of the casing with this frame.

In some embodiments, the casing in the fastened state does not interfere with displacement and shrinking of the margin portions of the plates at a filling step, as the casing extend at a distance from the frame or similar holding and retaining assembly.

In some options, the flexible pouch is inflated when filling the flexible pouch with the biopharmaceutical composition in a fluid state, and respective positioning members movable to reach an abutment state while being guided in the frame or similar holding and retaining assembly, are configured to constrain a middle of the flexible pouch more than two opposite ends of the flexible pouch. In some options, this constraining effect is due to a relatively lower relative displacement between first positioning members and first protecting body through-slots or embossments that interact with the first positioning members, the first protecting body through-slots or embossments being provided in an intermediate position in each of two opposite protecting body margin portions, as compared to displacement permitted at and/or near corners of the protecting body.

Typically, a clearance range may be sufficient to allow, in a filled-state of the pouch sandwiched by the plates, respective end parts of the protecting body to be still moved inwardly due to freezing of the aqueous liquid contained in the pouch (i.e. due to water expansion when it freezes).

The content of the bag stored in the casing and the content of the flexible pouch may be frozen simultaneously, typically without any step of displacing/removing the casing from its storage position, in which it is affixed to the protecting body outer surface.

Other features and advantages of the invention will become apparent to those skilled in the art during the description which will follow, given by way of a non-limiting example, with reference to the appended drawings.

DETAILED DESCRIPTION OF EMBODIMENTS

In the various figures, the same references are used to designate identical or similar elements.

In the different Figures, a vertical direction, a longitudinal direction and a lateral direction are based on the freeze/thaw containment system horizontally stored in a shelf. A direction perpendicular to the longitudinal direction is the lateral direction. One direction according to the height of the freeze/thaw containment system 1 is the vertical direction, reflected by direction Z in the FIG. 4 in particular.

Figure 4:
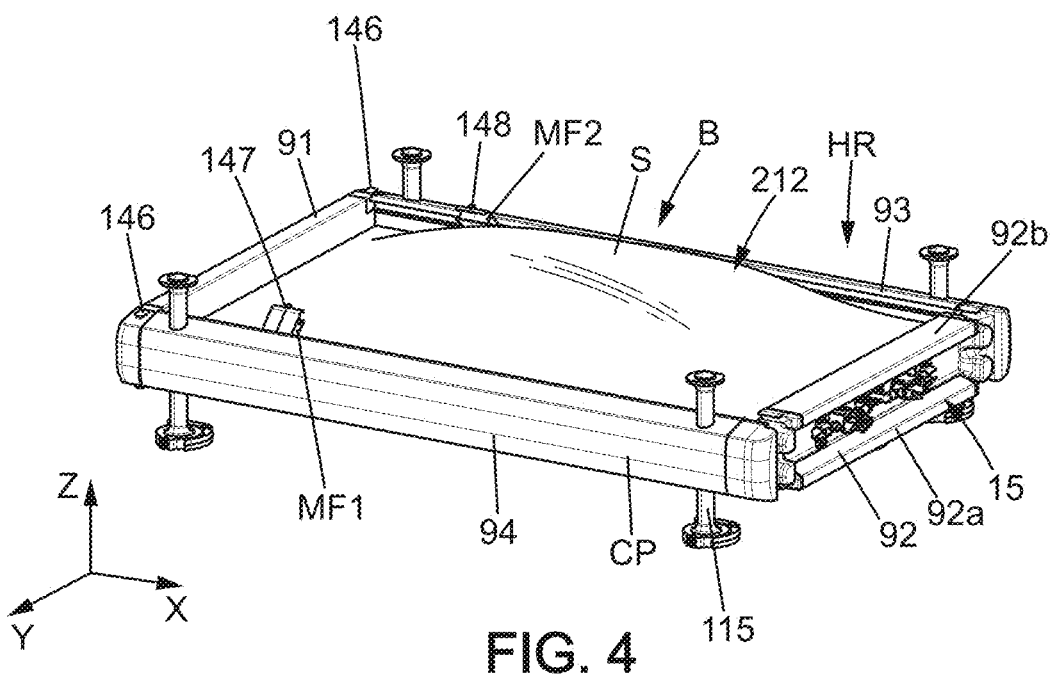
FIG. 4 is a perspective view showing a freeze/thaw system, using a peripheral frame that houses internal positioning members, in a filled configuration in which the positioning members are not active to limit inwardly movement and shrinking of the plates that sandwich the flexible pouch.
Figure 6A:
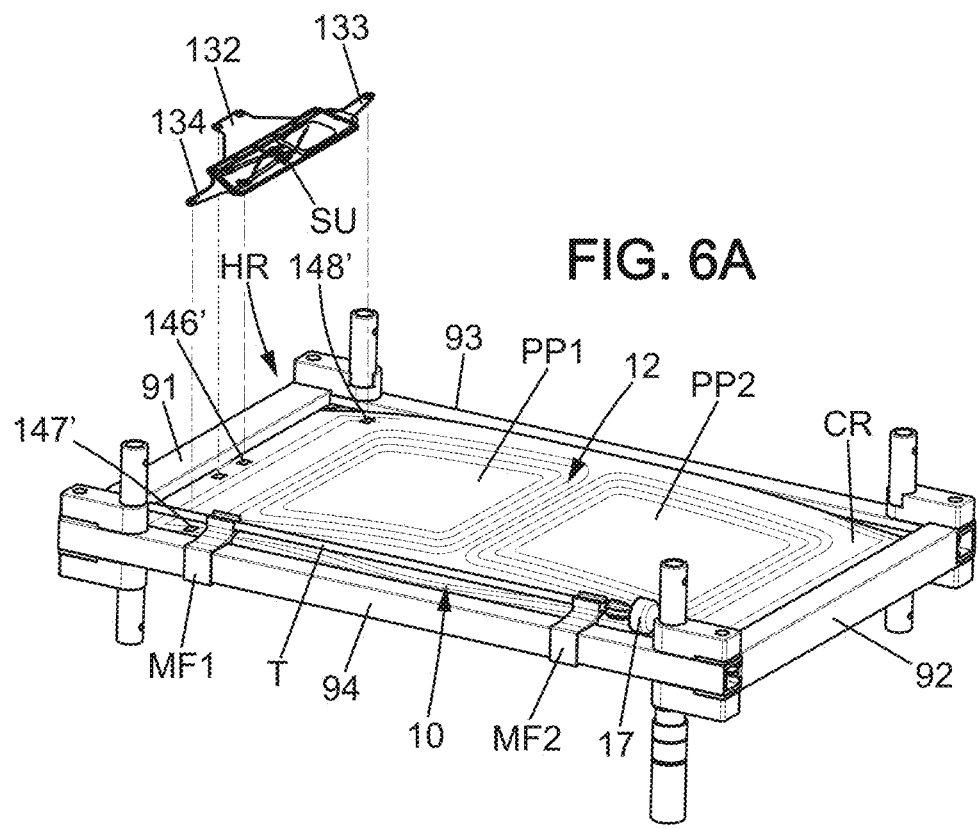
FIG. 6A is a perspective view similar to FIG. 4 but with some of the internal positioning members adjusted to selectively limit plate displacement and shrinking in a middle region of the protecting body, the plates being provided with a ribbing pattern.
Figure 10A:
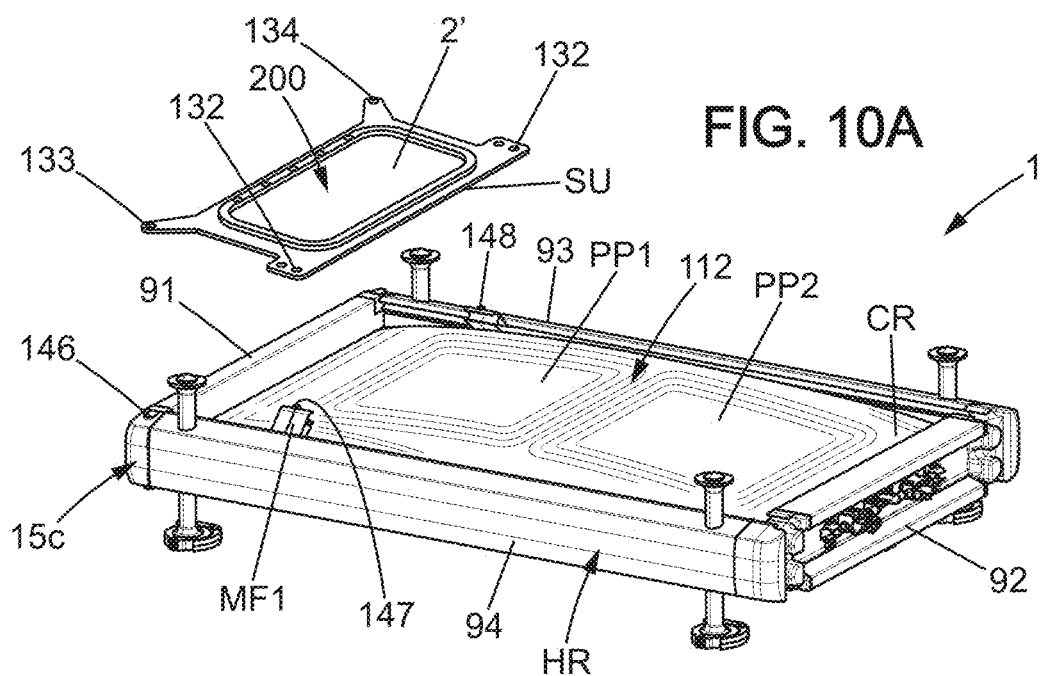
FIG. 10A is a perspective view of a freeze/thaw containment system able to support and attach a sample unit, here with some of the internal positioning members adjusted to selectively limit plate displacement and shrinking in a middle region of the protecting body.

In embodiments of the invention, the freeze/thaw containment system 1 may be such as illustrated in FIGS. 4, 6A and 10A, in order to include a protecting body (12, 112, 212) that covers both faces of a flexible pouch 2 for biopharmaceutical materials, hereafter called biopharmaceutical composition Q.

Figure 1:
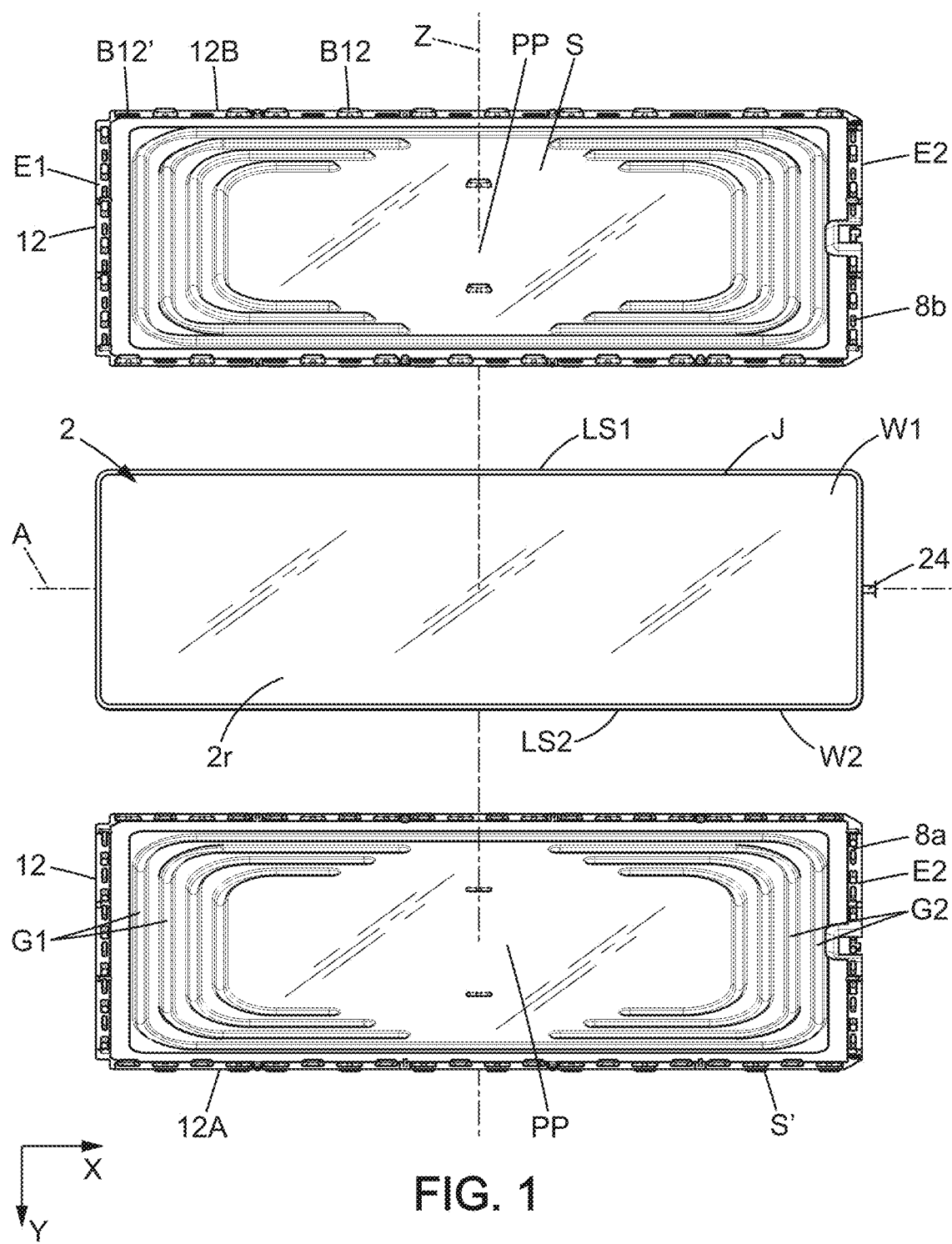
FIG. 1 is a perspective view of a storage unit in accordance with a first embodiment of the invention, before assembling the two plates of the protecting body.
Figure 2:
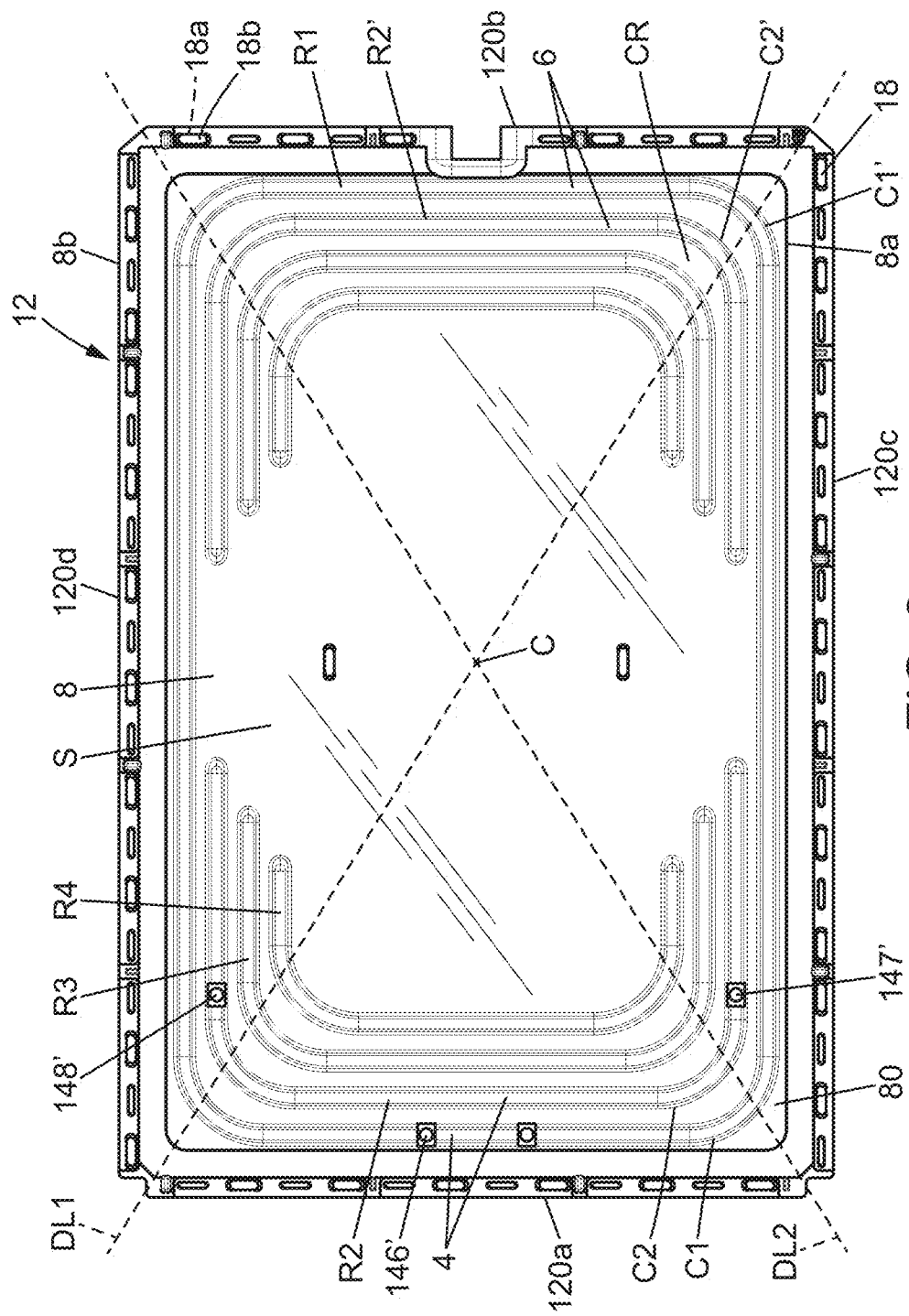
FIG. 2 is a top view showing the storage unit of FIG. 1 assembled, with a ribbing pattern provided on the protecting body top surface, including fastening members for affixing a bag, directly or indirectly.
Figure 3:
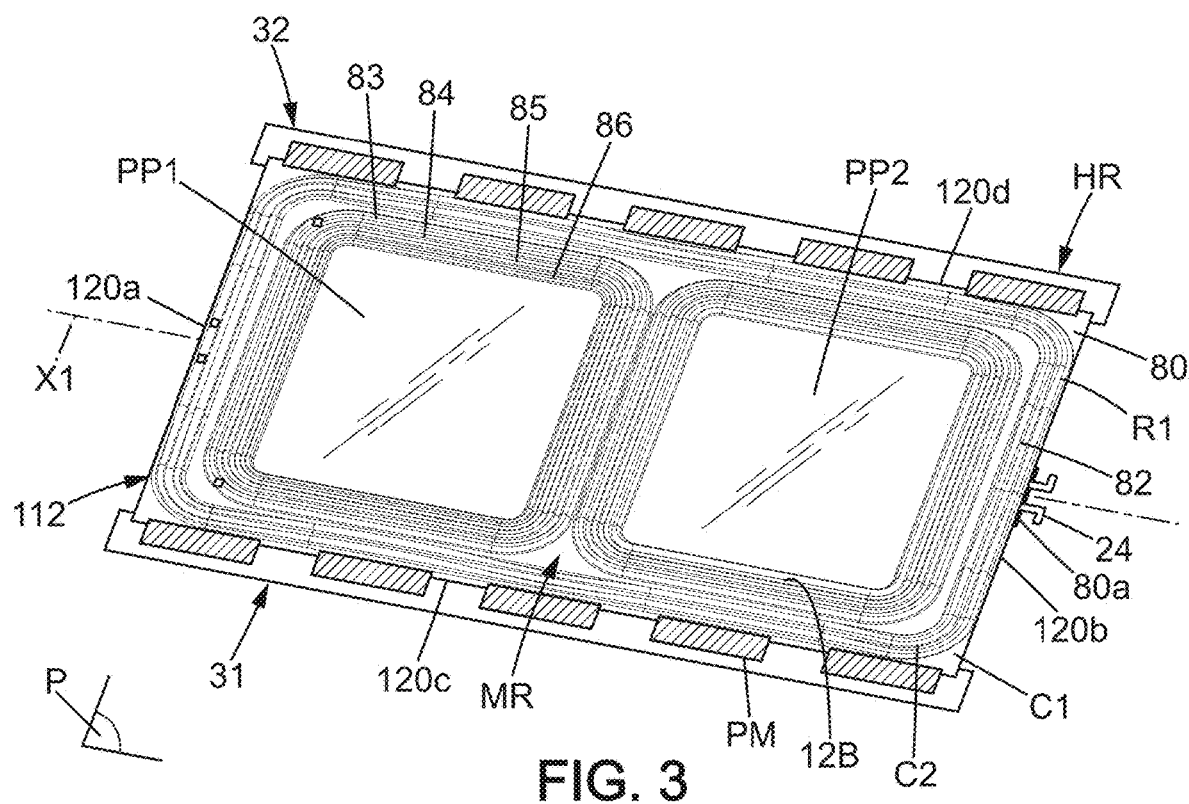
FIG. 3 illustrates a freeze/thaw containment system, in which a flexible pouch is sandwiched between the two plates forming the protecting body, in an empty state of the pouch, while a peripheral margin of the protecting body is sandwiched between positioning members.

Referring to FIG. 1-2 or 3, the protecting body 12 or 112 comprises two plates 12A, 12B for protecting the flexible pouch 2. The two plates 12A and 12B may be made separate. The protecting body 12 or 112 comprises ribs, typically on each plate 12A, 12B, while the protecting body shown in FIG. 4 comprises at least one outer surface S without any ribs.

Figure 6B:
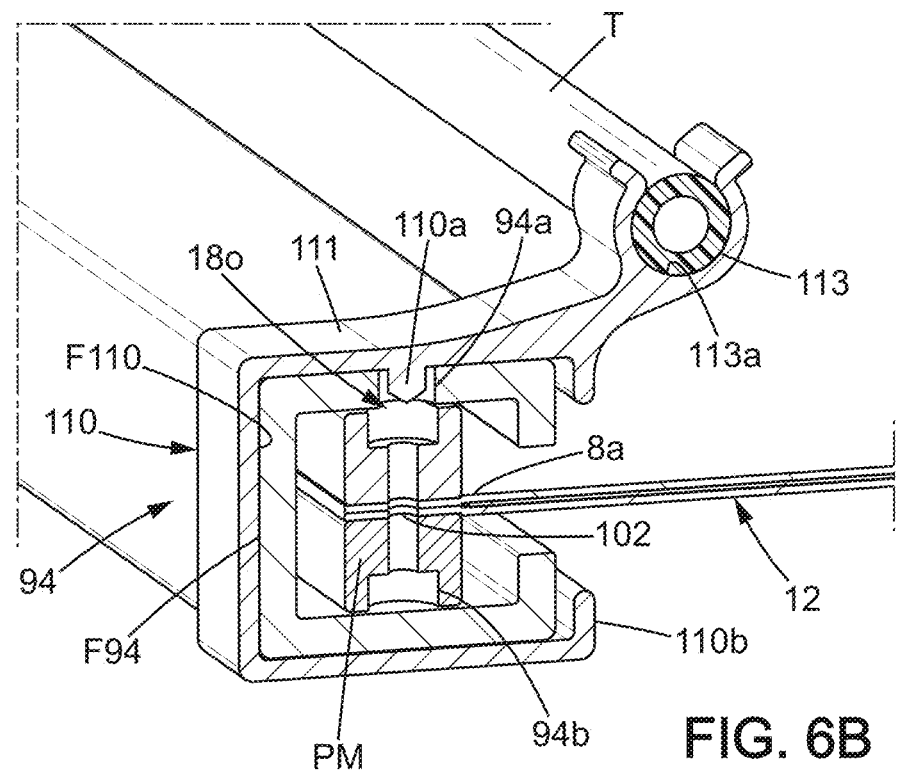
FIG. 6B is a perspective view of a detail of the system of FIG. 6A, showing a part of a tubing holder engaged on a frame of the system.

The protecting body 12, 112, 212 is obtained by fastening the two plates 12A, 12B in a circumferential part that surrounds a covering portion 8 that belongs to the protecting body 12. For instance, the protecting body 12, 112, 212 is assembled when sandwiching the empty pouch 2 by the covering part, by securing the circumferential parts of the plates 12A and 12B together. For this, an attachment device or attachment system 18 is provided, in order to fasten the two plates 12A, 12B. In an assembled state of the two plates 12A, 12B, the protecting body 12, 112, 212 comprises a peripheral margin 80. The peripheral margin 80 is obtained by securing respective margin portions 8a, 8b of the plates. Each plate annular margin may be composed of four outer band regions of the plates 12A and 12B. As illustrated in FIGS. 1 and 4, the flexible pouch 2 may be directly protected by two plates 12A, 12B of a protecting body 12. The attachment system 18 may be included in the plates and/or included in positioning members PM that are supported by the protecting body 12 at the peripheral margin 80. In some options, positioning members PM may form guiding parts for receiving one or more body crossing members. Referring to FIG. 6B, holes 18o may be provided in the positioning members PM for introducing rod-like crossing members cooperating with a locking part, a nut or bolt. Of course, slots may be provided in the protecting body 12, 112 or 212, for allowing the body crossing members to cross the peripheral margin 80 at a plurality of locations.

Figure 11:
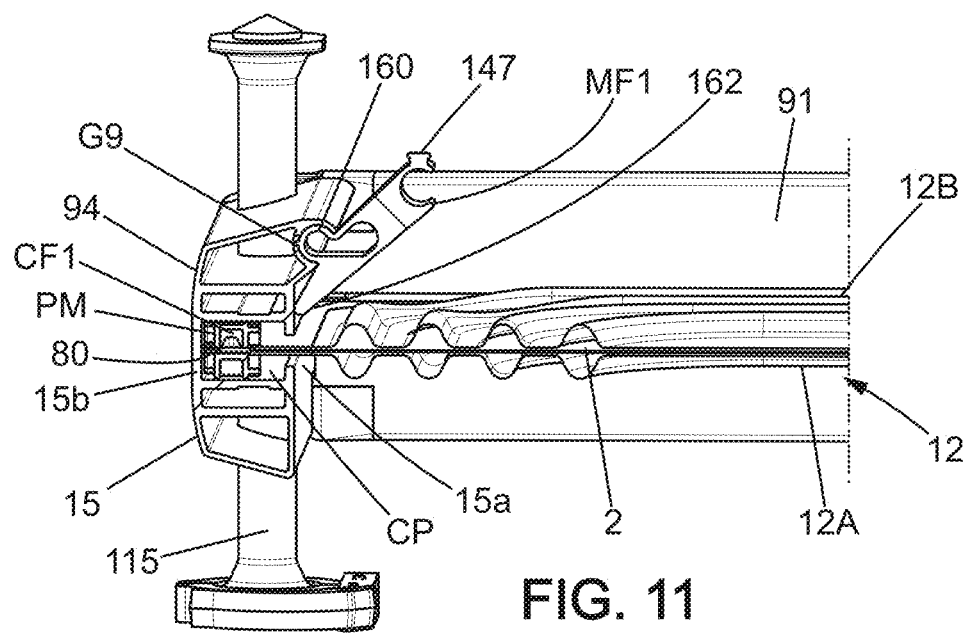
FIG. 11 is a vertical cut view illustrating a frame profile suitable for supporting a fixing element and for integration of a positioning member formed as a slider that is movable inwardly relative to a stationary frame part.

In other options, as illustrated in FIG. 11 in particular, the positioning members PM may simply sandwich the peripheral margin 80, possibly with an interlocking effect due to embossments B12, B12' (see FIG. 1) provided in the peripheral margin 80. Typically, the positioning members PM (here with discontinuous distribution) are sandwiching plate margin portions, selectively in the peripheral margin 80 as schematically illustrated in FIG. 3, while being unable to be disassembled once they are introduced in a frame 15 (here in any elongated cavity CP of the frame 15, as shown in FIG. 11), typically inside profiles 91, 92, 93, 94. Thus, there is no need for any additional insertion piece IP and the margin portions 8a, 8b may be provided with the embossments or boss portions B12, B12' for engagement with corresponding reliefs (cavities CF1) of the positioning members PM.

Referring to FIGS. 2-3, the peripheral margin 80 may extend annularly in a protecting body reference plane P, the peripheral margin 80 being provided with at least one opening 80a able to receive at least one port 24 of the flexible pouch 2. Two front ports 24 may be provided. For example, one port forms an inlet for the flexible pouch 2 and the other port forms an outlet of the flexible pouch 2.

The protecting body 12, 112, 212 may extend planar along the protecting body reference plane P, in non-filled state of the pouch 2.

Figure 7A:
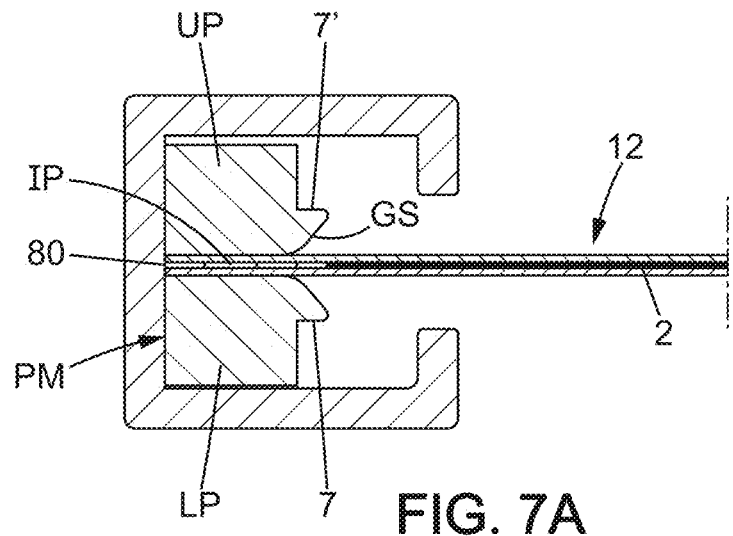
FIG. 7A is vertical cut view showing a positioning member suitable to form a stopper, configured to slide inwardly in a profile cavity with a limited stroke while retaining a portion of the peripheral margin of the protecting body.
Figure 7B:
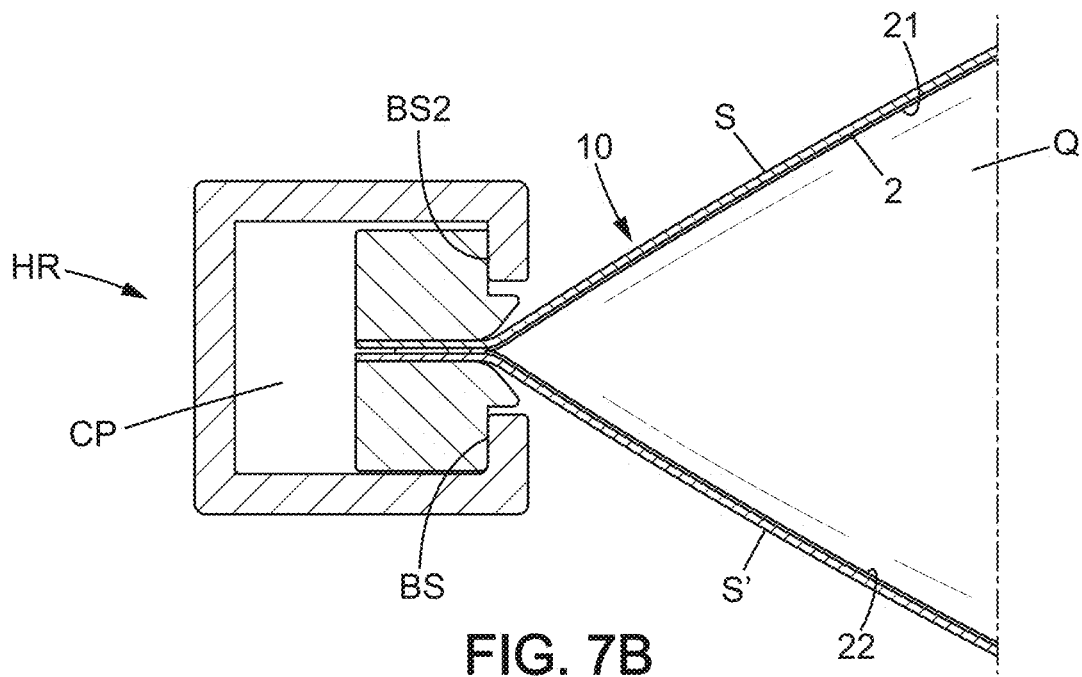
FIG. 7B is same vertical cut view as in FIG. 7A, showing an abutment position so that the positioning member stops inward movement of the corresponding peripheral margin portion of the protecting body.

The system 1 is suitable for containing, freezing/thawing a biopharmaceutical composition Q (see FIG. 7B). Referring to FIGS. 4, 6A and 10A, such system 1 is here horizontal, using a horizontal frame. However, this system may also be vertical in variants, so that the pouch 2 can be stored vertically in a cavity of a vertical frame-like holder (see for instance pouches described in WO 03037082, received vertically by use of rigid slotted frames). Use of a rectangular frame 15, provided with slots or cavities CP opening inwardly, may be of interest, in order to form a compact holder, able to accommodate respective margin portions of a storage unit 10.

The flexible pouch 2 is typically a 2D-type pouch, delimited by two longitudinal sides LS1, LS2 and having a substantially rectangular shape without predefined folds on its two main outer faces, as illustrated in FIG. 1 (empty pouch). Accordingly, the pouch 2 extends substantially planar in non-filled state. The pouch 2 may have two main walls W1, W2. These walls W1, W2 may be directly welded one to each other at a weld or peripheral seal J to delimit an interior volume for containing the biopharmaceutical fluid Q. More generally, the flexible pouch 2 may be of any suitable material for containing a biopharmaceutical composition Q and forms a freezer bag, which may be of large capacity, typically superior or equal to 5 L. More generally, the flexible pouch 2 is of a first capacity and the pouch 2 can expand to have an increase in thickness at least in a middle region away from the four pouch corners, such thickness increasing with the level of filling the pouch 2.

Referring to FIG. 1, the flexible pouch 2 extends in a main plane XY which is, here, the horizontal plane. The pouch 2 has a longitudinal axis A parallel to its long sides, which are here the two longitudinal sides LS1, LS2 in the non-limiting illustrated embodiment. The flexible pouch 2 is sandwiched by the plates 12A, 12B and cannot be removed without firstly removing at least one of the two plates 12A, 12B. The plates 12A, 12B are solidly attached to each other, typically without fixture with the pouch 2. A holding and retaining assembly HR may be provided, additionally to the attachment system 18, for holding the unit composed of the protecting body 12 and the attachment system 18.

The storage unit 10 provides efficient protection in freezing, storing and thawing operations, while the biopharmaceutical composition Q is contained in the receiving part 2r of the flexible pouch 2. The covering portion 8 of the protecting body 12 is not as flexible as the receiving part 2r of the flexible pouch 2, due to a difference in material (more rigid for the two pieces forming the plates 12A, 12B). When placed horizontally and maintained by the holding and retaining assembly HR, the two plates 12A, 12B respectively form a lower surface and an upper surface of the protecting body 12, 112, 212.

Referring to FIG. 2, at least one amongst the lower surface and the upper surface is a storage unit outer surface, optionally provided with fastening members 146', 147', 148' for allowing fastening of a bag 2', directly or indirectly.

Referring to FIG. 6A, the storage unit 10 can support a bag 2', here independently from the holding and retaining assembly HR. This bag 2' may contain a composition representative of the biopharmaceutical composition Q. The capacity of the bag 2' is a second capacity lower than the first capacity, preferably of a lower order of magnitude (i.e. at least 10 times lower).

Figure 10B:
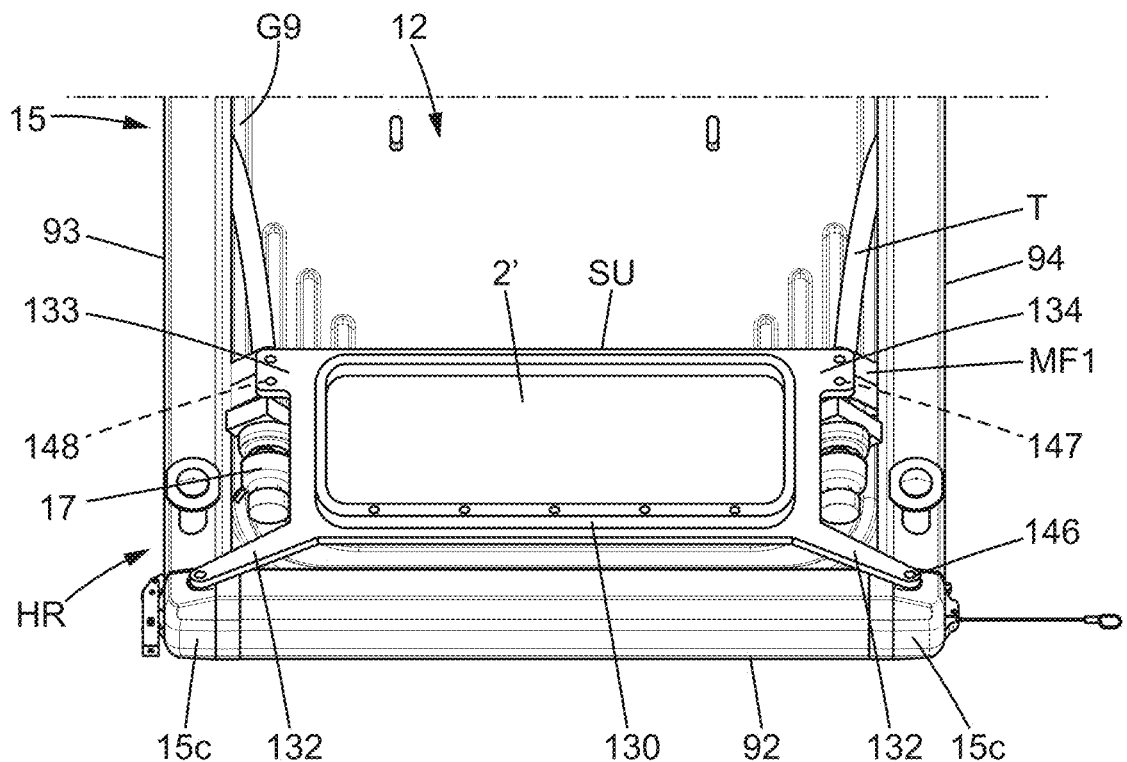
FIG. 10B illustrates a top view of a part of the freeze/thaw containment system of FIG. 10A but with another kind of ribbing pattern, with the sample unit attached to the system.

In another option as illustrated in FIG. 10B, the bag 2' is inside a casing 130 and supported by the frame 15 or any suitable holding and retaining assembly HR, so that the bag 2' extends above the protecting body 12, typically parallel to the protecting body 12.

The bag 2' and/or a casing 130 storing the bag 2' may be provided with fastening elements 132, 133, 134 cooperating with the fastening members 146, 147, 148 or 146', 147', 148', in order to have the bag 2' fastened (directly or indirectly) to the protecting body 12, 112, 212 and/or to a mounting set provided in the frame 15. In order to have the casing 130 affixed to extend along one of the outer surfaces S, S' of the storage unit 10, the fastening elements 132, 133, 134 can be distributed around a containing part 200 of the bag 2', here around the casing 130 that may include a compartment for housing the containing part 200. The containing part 200 of the bag 2' is the part of the bag 2' which defines the second capacity.

Figure 5A:
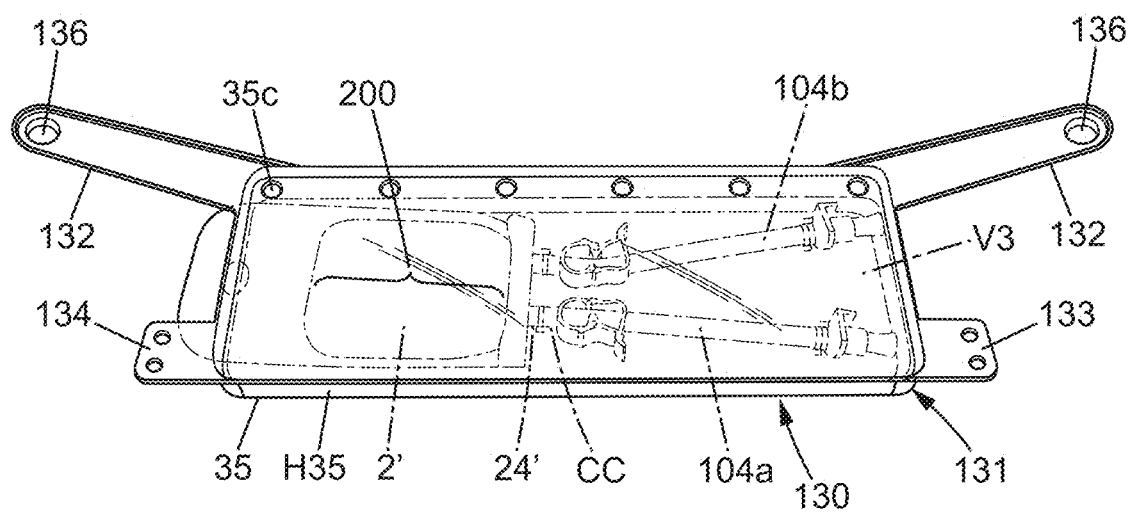
FIG. 5A is a perspective view of a first exemplary casing for housing a bag, provided with fastening elements around the side wall of the casing.
Figure 5B:
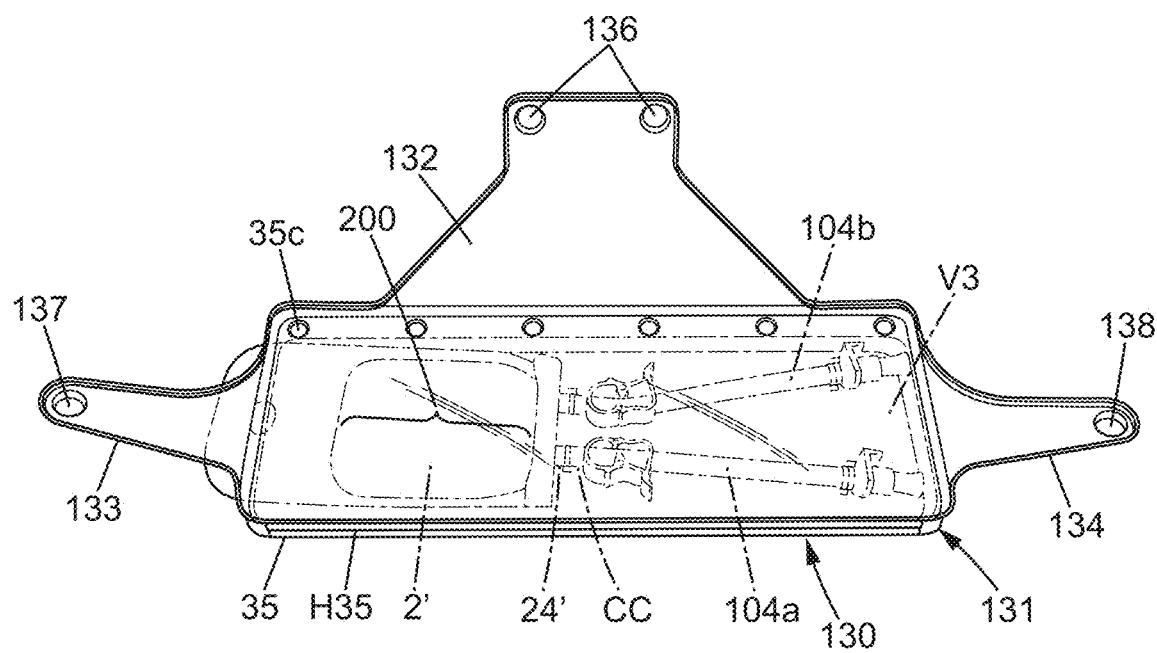
FIG. 5B is a perspective view of a second exemplary casing for housing a bag, provided with fastening elements around the side wall of the casing.

Here, FIGS. 5A and 5B show two variations of a casing 130, with a different arrangement of the fastening elements 132, 133, 134.

In option of FIG. 5A, the fastening elements 132, 133, 134 essentially extend along a same direction which is transverse or perpendicular to length extension of the protecting body 12, in the assembled state as shown in particular in FIG. 10B.

Each pouch 2 may be filled with a solution, fluid composition Q, to be frozen and held with slight compression between the two plates 12A, 12B that serve as heat-exchange surfaces. For this purpose, the plates 12A, 12B completely cover the pouch 2, at least in the fluid receiving part 2r, i.e. region defining the interior volume of the pouch 2 (i.e. typically all the walls W1, W2 with possible exception of the annular seal J and optional outer extension(s)). In the illustrated embodiments, the pouch 2 is entirely covered by a protecting body 12, 112, 212 which is formed by the two plates 12A, 12B. During freeze/thaw operations, the plates 12A, 12B are cooled/heated by circulating heat transfer fluid, for instance from an external, programmable refrigeration unit. The slight compression (containment effect) provides improved contact and heat transfer, resulting in a frozen pouch having the general shape of a pillow (see FIGS. 4 and 6A in particular).

Figure 8:
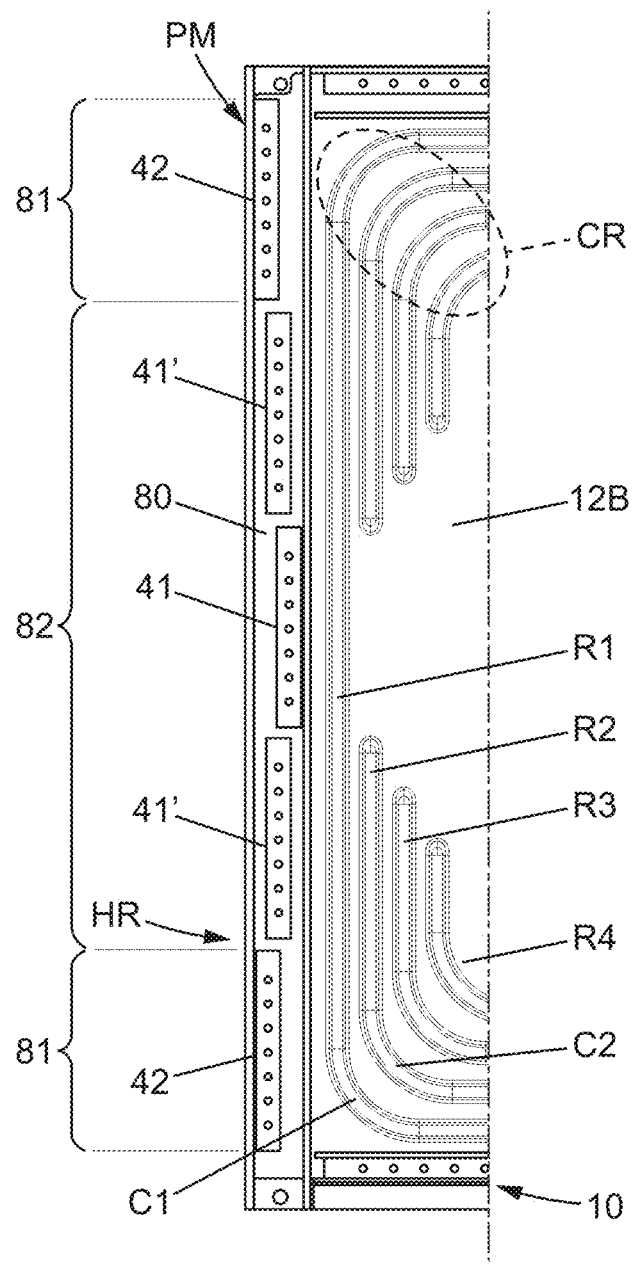
FIG. 8 illustrates a detail of an exemplary distribution of positioning members provided for holding/maintaining a same longitudinal side of the peripheral margin of the protecting body, allowing limiting bulge effect in a middle region of the storage unit in filled state of the flexible pouch.

The pouch 2, sandwiched between the plates 12A, 12B may be placed in a frame 15, here a rigid frame compatible with temperatures below 0° C., so as not to damage the material inside during handling and transport. Referring to FIGS. 4 and 6A, the frame 15 may be part of a supporting structure. Here, the frame 15 is a modular part of a device or shelf that may be located in a freezing apparatus. Rollers (not shown) may be provided for facilitating transportation. The frame 15 is typically a rectangular protective frame, leaving the outer surfaces S, S' of the protecting body 12 exposed but forming four protecting sides around the storage unit 10. The frame 15 may be included in a holding and retaining assembly HR, which also includes positioning members PM engaged in the peripheral margin 80 of the protecting body 12, 112 or 212, as illustrated in FIG. 8 in particular. The assembly may comprise a plurality of feet, possibly of tubular shape and suitable for stacking.

More generally, the pouch 2, the protecting body 12, the sample unit SU (including the bag 2' and the casing 130), and the holding and retaining assembly HR may define a freeze/thaw containment system 1, in which outer surfaces S, S' (here corresponding to the lower surface S' of the lower plate 12A and the upper surface S of the upper plate 12B) remain exposed (uncovered), while the flexible pouch 2 is placed inside the storage unit 10, covered by the two plates 12A, 12B. The protecting body 12 has a peripheral margin 80 which is engaged in interspaces of the holding and retaining assembly HR. The storage unit 10 is suitable for use in freezing, storing and thawing biopharmaceutical fluid/composition Q contained in a flexible pouch 2, the fluid being typically introduced after assembling the storage unit 10 with the flexible pouch 2, which is typically a disposable pouch, housed in the protecting body 12, and after the storage unit 10 has been mounted in the frame 15.

In FIGS. 6A and 7B, it can be seen that the pouch 2 is housed in the storage unit 10, inside the protecting body that is retained by frame profiles or similar protective parts. This storage unit 10 comprises the protecting body 12 and positioning members PM forming interface for mounting of the storage unit 10 in a protective shell or assembly HR including two or four protective parts, which may be elongated profiles 91, 92, 93, 94. Use of four rigid profiles is of interest for forming a rectangular frame 15. Optionally, the pouch 2 may be of the Flexboy® type (possibly with 50L capacity or more), and thus is a sterile, single-use, disposable container, adapted to be enclosed by the frame 15 obtained after assembling the profiles 91, 92, 93, 94 or similar holding elements.

In some options the holding and retaining assembly HR may have less than four members, so as not to form a rectangular frame. For instance, only three members may be sufficient, with a transverse member interconnecting two longitudinal covering parts 31, 32 parallel to the longitudinal axis A of the pouch 2. FIG. 3 only shows two covering parts 31, 32 that may be integral with feet or which may be associated to a transverse structure member. In some options, the covering parts 31, 32 may extend vertically. In the illustrated embodiments, the covering parts 31, 32 extend horizontally, which may be preferred when the pouch contains more than 50 L, for instance about 75 L or at least 100 L. FIGS. 4, 10A and 11 show exemplary parallel covering parts 31, 32, which include two single-piece profiles 93, 94. Each single piece profile 93, 94 may be hollow, defining each an elongated cavity CP for insertion of the positioning members that allow positioning the storage unit 10 and the reference plane P, typically perpendicularly to feet 115 that are connected to the covering parts 31, 32. The feet 115 allow the reference plane P to be shifted upwardly, as compared to level of the ground. This is of interest to allow for vertical expansion of the covering portion 8 that belongs to the protecting body 12, here extending substantially horizontal.

Referring to FIGS. 3 and 7A-7B, the pouch 2 may have a form or shape that is initially planar in empty state. The pouch 2 is flexible, in order to be inflatable, and may be made from a pair of flexible sheets (which form the respective walls W1, W2), having a rectangular or other plan form, and joined together at the four peripheral edges, to provide a containment volume (interior volume for composition Q) between the sheets 21, 22, which are spaced by a spacing in a filled state. One or more openings or ports 24 may be provided, for example formed as closable tubes between facing parts of said peripheral edges of the sheet, to allow the pouch 2 to be filled or emptied.

The pouch 2 is also designed to provide a high surface area/volume ratio at a thin thickness or spacing. By way of non-limiting example, a pouch 2 may have rectangular dimensions of about 600 mm by about 1300 or 1400 mm, and/or a holding volume of between about 10 liters and about 120 or 200 liters (preferably between 50 and 120 liters), and/or a spacing or pouch thickness (height along Z direction) of between about 8 or 10 mm to about 25 or 30 mm.

Each pouch 2 may be made from any suitable biologically compatible material, and which preferably facilitates heat transfer between the inside and the outside of the pouch 2. To reduce or avoid damage to the pouch 2 during cryopreservation due to the expansion of the biopharmaceutical material, it is preferred that the material would have a glass transition temperature that is below that of the biopharmaceutical material. By way of non-limiting example, each pouch 2 may be made from a multilayer composite material only made of thermoplastic material, for instance including polyethylene (at least a layer of PE).

The protecting body 12 and the flexible pouch 2 comprise a longitudinal direction X and a transversal direction Y. The protecting body 12 and the flexible pouch 2 comprise each longitudinal and transversal sides. The longitudinal axis X1 of the protecting body 12 may be placed in a median vertical plane separating two symmetrical halves for each plate 12A, 12B of the protecting body.

The pouch 2 optionally includes one or more tubes T joined to a front end (at a transversal side) that extends transversally relative to the longitudinal sides LS1, LS2. More generally, the pouch 2 may comprise one hose/tube or any suitable number of tubes that are connected to a periphery of the useful part of the pouch 2. This useful part is here formed by the two main walls W1, W2.

Protecting Body

Referring to FIGS. 1 and 3-4, the protecting body 12 or 112 comprises or consists in two plates 12A, 12B for protecting the flexible pouch 2. The plates 12A, 12B are entirely separate, here without hinging or connecting part. Typically, the plates 12A, 12B are two separable pieces. These pieces are relatively rigid, for instance sufficiently rigid so that they cannot form folding lines with bending angle of more than 45°. The plates 12A, 12B are thus configured to remain relatively flat. The protecting body 12, 112, 212 comprises a longitudinal axis X1 and has four sides 120a, 120b, 120c, 120d, the four sides comprising two longitudinal sides 120c, 120d extending parallel to the longitudinal axis X1 and two other sides that include a first end side 120a, and a second end side 120b each perpendicular to the longitudinal axis X1.

Referring to embodiments of FIGS. 1-3, in each plate 12A, 12B, a first group of ribs is provided with ribs R1, R2, R2', 800 arranged close to the peripheral margin 80. An optional second group of ribs may be provided with ribs R3, R4, 83, 84, 85, 86 arranged at a greater distance from the peripheral margin 80. Such ribs of the second group may surround one or two panel portions PP, PP1, PP2, which are typically forming rectangular panels, in each outer surface S, S' of the protecting body 12, 112.

In some variants, the number of ribs may be reduced or the ribs may be removed. When elongated ribs are provided, they are preferably sufficiently wide for forming grooves G1, G2 of rounded profile (as viewed in cross section). Each elongated groove may have an interior width at least equal to 10 mm, typically superior or equal to 15 or 20 mm. A wavy profile may be obtained locally due to such grooves.

In the illustrated embodiments, the protecting body 12, 112, 212 preferably has an attachment device/system 18 for fastening the two plates 12A, 12B so that in an assembled state of the two plates, the protecting body 12, 112 comprises a peripheral margin 80 that extends annularly in a protecting body reference plane P as illustrated in FIGS. 3 and 4. In some options, the peripheral margin 80 that extends in an interior interspace delimited by the frame 15 is typically a margin without ribs. In variants, one or more ribs R1 adjacent to the margin part for mutual attachment of the plates 12A, 12B may extend in such interspace.

The protecting body may be provided with:
  a first end side 120a, which is composed of the ends E1 of the two plates 12A, 12B in the assembled state of the protecting body 12, 112, 212, and
  a second end side 120b, which is composed of the ends E2 of the two plates in the assembled state of the protecting body 12, 112.

The one or more ports 24 may protrude axially outward from the second end side 120b. Here a part of the pouch front edge is thus accessible.

In empty state of the pouch 2, the two plates 12A, 12B respectively form a first surface S' and a second surface S of the protecting body 12, 112 covering the pouch 2. When having a substantially horizontal configuration, the first surface is a lower surface and the second surface is an upper surface. The fastening members 146', 147', 148' can be provided on one of these surfaces S, S', near an end side chosen amongst the first end side 120a and the second end side 120b. Embodiment of FIGS. 2 and 6A illustrate a way of having small separate regions, possibly formed as male parts or embossments, for fixing a sample unit SU at corresponding female parts, hollows or apertures 136. While, the fastening members 146', 147', 148' are here all provided on a same piece forming one of the two plates of the protecting body 12, at least one of the fastening members can also be included in the holding and retaining assembly HR, i.e. in a region extending around the pouch 2 and the covering portion 8. For instance, the sample unit SU may have several arms or tabs extending from the casing 130 containing the bag 2', at least one of the arms or tabs being a fastening element 132 attached to a transverse profile 91 or similar rigid part included in the frame 15 of the assembly HR.

In embodiments of FIGS. 4 and 10A-10B, the sample unit SU is not supported by any part of the protecting body 12, 112. In contrast, the arms or tabs of the sample unit SU are extending from the casing 130 for joining a mounting set including the frame 15, with each of the arms or tabs forming respective fastening elements 132, 133, 134 joining such mounting set, typically at junctions located above and around the protecting body 12, 112. At least one amongst the lower surface S' and the upper surface S may be a surface having a plurality of ribs distributed in two opposite parts of the surface, which are longitudinally opposite parts. Preferably, the ribs of this plurality include first transverse rib portions 4 proximal to the first end side 120a and second transverse rib portions 6 proximal to the second end side 120b.

Such transverse ribs provide an accordion effect due to width of the corresponding grooves G1, G2 formed by the ribs and/or height of the ribs (depth of the grooves G1, G2). This facilitates local expansion of the plates 12A, 12B despite the planar structure of the peripheral margin 80 forming the protecting reference plane P. Typically, in corner regions CR, the first and second transverse rib portions 4, 6 have a height decreasing with decreasing space from the corner vertices of the plate having such rib portions 4, 6.

Accordingly, too great expansion that could create undesirable folds (along diagonal lines) may be limited or prevented when having height reduction for the corner rib portions, extending in the corner regions CR. In other words, accordion effect may be practically reduced in the four corner regions CR in each plate 12A, 12B. More generally, structuring of the plates 12A, 12B, using first and second transverse rib portions 4, 6 is helpful, in order to facilitate spreading of fluid toward the margin 80 and toward the corners of the protecting body 12, 112 when filling the flexible pouch 2 sandwiched between the plates 12A and 12B.

This is of interest, in order to have or improve a belly retention effect. Indeed, the more the fluid can be distributed toward the four corners, the less bulged is the pouch 2 in a middle region. The protecting body 12, 112 is typically able to move in interspaces of the holding and retaining assembly HR, as described in more detail below. Besides, the structuring effect of the ribs may prevent folding lines to form substantially along the diagonals DL1, DL2, when difference in thickness/expansion between the middle region including the center C of the protecting body and the covering portion edges is too pronounced. In some options, no corner rib is present.

Some detailed embodiments of a protecting body 12 or 112 provided with a ribbing pattern will be described hereinafter.

The plates 12A, 12B as illustrated in FIGS. 1, 2, 4 and 7 correspond to a first embodiment of the protecting body 12, in which several ribs are provided. In each outer surface of the plate, the ribs are provided so that the inner face is provided with grooves. Some grooves G1, G2, such as shown in FIG. 1, are including transverse groove portions extending perpendicular to the longitudinal axis X1 and close to the opposite end sides 120a, 120b of the protecting body. An annular rib R1, protruding upwardly in the outer surface S or S', may be provided to define the groove G1 which is of annular shape on the plate interior surface. Two separate ribs R2, R2' protruding upwardly in the outer surface S or S', may be provided to define the one or two grooves G2 which are each of annular shape on the plate interior surface.

Thanks to the ribs R1 and R2, R2', a pair of transverse rib portions 4, 6, here parallel to Y-axis direction (perpendicular to the longitudinal axis X1) may be arranged close to the respective end sides 120a, 120b. In other words, these ribs form the first transverse rib portions 4 proximal to the first end side 120a and the second transverse rib portions 6 proximal to the second end side 120b.

Referring to FIGS. 1-2, it can be seen that each plate 12A, 12B may be rectangular with four corner regions CR, two virtual diagonal lines DL1, DL2 (diagonal lines of the plate) intersecting each a pair of corner vertices of the four plate corners. More precisely, each of the two virtual diagonal lines DL1, DL2 intersect:
- a first series of corner ribs C1, C2 proximal to the first end side 120a and protruding outwardly along a direction perpendicular to the protecting body reference plane P, and
- a second series of corner ribs C1, C2' proximal to the second end side 120b and protruding outwardly along a direction perpendicular to the protecting body reference plane P.

Each of the corner ribs C1, C2, C1', C2' is curved and connects two rib portions that are perpendicular one to each other. Here the annular rib R1 thus may include two pair of corner ribs C1, respectively C1'.

While embodiments of FIGS. 1-2 show ribbing patterns, in which the ribs may be considered as peripheral ribs, arranged around a central panel portion PP of the plates 12A, 12B, FIGS. 3 and 6A show that ribs may be provided in a middle region MR, possibly extending transversally to separate two panels PP1, PP2 of a same plate.

While same ribbing pattern is provided in the two complementary plates 12A, 12B in embodiments of FIGS. 1-3 and 6A, some differences may be provided in variants. Optionally, one or two of the plates may be deprived of ribs.

The plates 12A, 12B form each a stiffening layer when overlapping, and preferably entirely covering, the main walls W1, W2. The thickness of each plate 12A, 12B before thermoforming is of about 1.27 mm and/or may be lower than 2 mm, with provision that the plastic material of the plates has a density superior to 1.10 g/cm$^3$, preferably superior to 1.15 g/cm$^3$ (typically without being above 1.5 or 1.6 g/cm$^3$). Plate material may have a tensile strength at break, which is typically between 45 and 75 MPa, for example in the range 50-60 MPa, typically 52-59 MPA (standard test ASTM D638).

While the illustrated embodiments show a protecting body 12 covering entirely the two main walls W1, W2 by the covering portion 8, other size may be used for the covering portion 8. For instance, the protecting body 12 could only cover a transverse band portion of each wall W1, W2, at a distance from one of the two pouch opposite edges. Besides, one or more complementary protecting bodies could be used to cover at least one of the end parts of the walls W1, W2.

Details of Embodiments for the Attachment System for Attaching the Plates Together The protecting body 12 may have a covering portion 8 for covering the pouch 2 and two opposite margin portions 8a, 8b at two longitudinal sides 120c, 120d of the protecting body 12. In non-filled state of the pouch 2, the protecting body 12 extends flat and remains flat along a protecting body plane P. The plates 12A, 12B remain attached at several location of the peripheral margin 80 during handling of the system 1, thanks to an attachment system 18.

The protecting body 12 may be transparent, the pouch 2 being also transparent for instance. The plates 12A, 12B can have a general curvature but cannot easily fold (flexibility being substantially as low as PET). The peripheral margin 80 may form an annular attachment area, in which no folding is permitted.

Referring to FIG. 2, the protecting body 12 is also provided with an attachment system 18 for fixing the two plates 12A, 12B to each other, around the covering portion 8. The plates 12A, 12B may be removably fixed to each other by the attachment system 18 distributed in the peripheral margin 80.

Optionally, the attachment system 18 may comprise a plurality of snap buttons. One of the two plates 12A, 12B comprises a first element of one snap button and the other plate comprises a second complementary element of one snap button. Referring to FIG. 2, the second element 18b (possibly a male element) engages the first element 18a (possibly a female element) in a direction parallel to the vertical axis Z.

Alternatively, the attachment system 18 is a non-removable system, which means that, once the two plates 12A, 12B are fixed to each other, it is not possible anymore to detach the two plates 12A, 12B one from each other.

In the non-limiting embodiment of FIGS. 1-2, the protecting body 12 may comprise:
- snap buttons 18a, 18b on transversal sides 120a, 120b and on the two margin portions 8a, 8b;
- and/or apertures 102 (see FIGS. 6B and 7A) for receiving an insert piece IP or similar anchoring member that is not included in the plates 12A, 12B.

In options using snap buttons or similar fastening parts included in the plates 12A, 12B, such fastening parts can be symmetrically arranged on the transversal ends of the two plates 12A, 12B. Alternatively, the protecting body 12 may comprise more snap buttons on the front side 120a that in the rear side 120b.

In some embodiments, the fastening parts used for mutual attachment of the plates 12A, 12B may also form protruding reliefs or hollows involved for receiving/plugging the positioning members PM. For instance, at least two amongst the embossments B12, B12' shown in FIG. 1 may cooperate with elongated positioning members PM such as illustrated in FIG. 11 (here formed as parallelepiped pieces), by forming a receiving part. A plugging effect is obtained by pushing a plugging face of each positioning member PM toward the complementary receiving part provided in the peripheral margin 80. Each plate 12A, 12B can receive such positioning members PM, typically with regular distribution around the covering portion 8 of the protecting body 12, as it is shown for instance in FIG. 3 or 8 (non-limiting examples).

More generally, the attachment system 18 may typically comprise any suitable mechanical fasteners arranged between the covering portion 8 and the longitudinal sides 121, 122. Typically, the two opposite margin portions 8a, 8b may be considered as part of a fastening assembly provided to prevent any shifting in position between the two plates 12A, 12B once they are mutually fastened at least in the two margin portions 8a, 8b.

As can be seen on FIGS. 2-4, 6A-6B and 7A-7B, when the two plates 12A, 12B are fixed to each other, they sandwich the flexible pouch 2. The planar plate 12A, which forms the lower surface S' of the protecting body 12, presses the lower surface of the flexible pouch 2, with respect to the vertical axis Z. Similarly, the planar plate 12B, which forms the upper surface S of the protecting body 12, presses the upper surface of the flexible pouch 2, with respect to the vertical axis Z. The two plates 12A, 12B may have planar dimensions which are substantially identical to the ones of the flexible pouch 2.

Holding and Retaining Assembly

Referring to FIGS. 2, 3, 4 and 10A, the holding and retaining assembly HR comprises a frame 15 and, optionally, positioning members PM that either cooperate with or are part of the attachment system 18. The positioning members PM, here covering or included in the attachment system 18, are able to move relative to the frame 15 acting as a stationary part of the holding and retaining assembly HR. In some embodiments, the two longitudinal covering parts 31, 32 comprise profiles and may be considered as belonging to the holding and retaining assembly HR. The positioning members PM may be introduced in profiles of the frame 15 or may be attached to similar covering parts 31, 32 before assembling the assembly HR (typically before assembling a frame 15).

The two covering parts, such as shown in FIG. 3, are arranged to maintain two longitudinal margin portions 8a, 8b of the peripheral margin 80, while allowing the two plates 12A, 12B moving, extending, and shrinking in a transverse direction belonging to the protecting body reference plane P. As illustrated in FIGS. 4 and 11, the two longitudinal covering parts 31, 32 may comprise two profiles 93, 94 each delimiting an interior cavity CP. In non-limiting embodiments, the interspaces may be respective interior cavities CP of such covering parts. Each of the two longitudinal covering parts 31, 32 may include a profile that is substantially C-shaped or U-shaped to delimit one of the interior cavities CP.

Referring to FIGS. 2, 6A and 10B-11, it is understood that the pouch 2 is sandwiched between the plates 12A, 12B but without interfering with the hose(s) or tube T each provided with an end connector 17. The protecting body 12, 112, 212 may be firstly assembled and, then the two protective parts 31, 32 are assembled to complete or cover the attachment device 18.

Typically, the holding and retaining assembly HR comprises a frame 15, here of rectangular shape, provided with four sides. The longitudinal covering parts 31, 32 may be protected in profiles 93, 94 forming the two longitudinal sides of the frame 15. Other covering parts provided along transverse sides of the protecting body 12, 112, 212 may also be included in the attachment system 18. Optionally, such other covering parts may be housed/protected in profiles 91, 92 forming the two transverse sides of the frame 15.

More generally, several profiles may form all or part of the frame sides. Preferably, at least four rigid profiles 91, 92, 93, 94 arranged in rectangular manner form the four sides. Two of the four profiles are included in or form the two longitudinal covering parts 31, 32. These two profiles 93, 94 are formed as two longitudinal slides for receiving each at least three of the positioning members PM, which are separate and distributed along a length of the frame 15. Optionally, the two other profiles 91, 92 may also form slides, here transverse slides, to accommodate the transversal sides 120a, 120b of the protecting body 12, 112, 212. Similar positioning members PM may be slidably mounted in the rail-like profiles 91, 92.

The holding a retaining assembly HR can maintain the protecting body horizontally or vertically, the frame 15 being also of interest for forming a peripheral protection around the protecting body 12, 112, 212. The peripheral frame 15 houses the internal positioning members PM that have size along Z direction that is greater than the corresponding size (along same direction) of the opening at the open side of the profiles 91, 92, 93, 94. While four similarly constructed profiles 91, 92, 93, 94 are here provided to house positioning members PM on each of the four sides, variants with one or two sides without such positioning members PM may be provided. Besides, variants with another kind of covering parts 31, 32 mays be provided, either with ability to have a shrink management of some sides of the protecting body 12, 112, 212, or without possibility to have such shrink management (for example if the capacity of the pouch 2 is relatively low).

The structure shown in FIG. 4 is of interest for relatively large capacity pouches 2, which could have a significant bulge B without any shrink-management at the peripheral margin 80.

The holding and retaining assembly HR may be assembled after mounting the positioning members PM in the peripheral margin 80. As illustrated in FIGS. 10A-10B, corner sections 15c may be used between adjacent perpendicular profiles. At least two corner sections 15c may be fastened to the transverse profile 91 (which is here a rear profile) before or after placing the longer profiles 93, 94. The positioning members PM may be arranged outside the corner sections 15c. One or two corner section 15c and at least three profiles 91, 93, 94 of the frame 15 may be provided to form the mounting set, involved for supporting the protecting body 2. The mounting set further functions as a receiving device for attachment of the sample unit SU.

Referring to FIG. 10A-10B, the fastening members 146, 147, 148 may be distributed:
  on the two corner sections 15c; and
  on two support accessories directly engaged in the longitudinal profiles 93, 94 or similar covering parts of the holding and retaining assembly HR.

Here, three separate supporting members belonging to the holding and retaining assembly HR can form a rigid peripheral part combining a first function of attaching/holding the storage unit 10, along a plane which is typically horizontal, and a second function of bearing or forming several fastening members 146, 147, 148 each extending above the protecting body 12, in order to interlock with the complementary fastening elements 132, 133, 134 extending around the casing 130 or similar containing part of the sample unit SU.

The rigid peripheral part may be the frame 15 as illustrated in FIG. 6A or 10A. When four corner sections 15c interconnect the frame profiles 91, 92, 93, 94, the peripheral margin 80 may have having only one opened side that is located between two corner sections, laterally covered by a profile 92 provided with an opening. At the frame side opposite from such profile opening for the port(s) 24, two corner section 15c can directly define two fastening members 146, as illustrated in FIGS. 10A-10B for the fastening of the casing.

Of course, the frame 15 may be formed in various manners, using any suitable rigid covering parts that can protect the region/location of the storage unit 10 and the region/location of the sample unit SU. Preferably, the frame 15 can surround a casing 130 of the sample unit SU and maintain the sample unit SU in a position close from a plate of the protecting body, with or without contact with the protecting body 12, 112, 212.

Tubing Holder

Referring to FIG. 6A, two hoses or tubes T are typically connected to a front edge of the flexible pouch 2. A rear edge of the flexible pouch 2, at a longitudinal end opposite to the front longitudinal edge, may extend substantially parallel to the front edge. While each tube T may be bent and have a length superior to length of the longitudinal sides LS1, LS2 of the pouch 2, any size of hose/tube may be used. Each tube T may be maintained substantially parallel to the protecting body reference plane P, by attachment to a tubing holder provided in or attached to the frame 15 of the assembly HR.

Each hose/tube T is provided with a connector 17 for fluid connection, typically a connection to another biopharmaceutical device. The connector 17 thus makes it possible to fluidly connect the flexible pouch 2 to another element, for example a tank. In storage position of the tube (s) by use of the fixation means MF1, MF2, each connector 17 may be located between the longitudinal rear side 120b of the protecting body 12 and the middle region MR.

Referring to FIG. 4, one or more of the elongated profiles, here the profile 94, may be provided with one or more fixation means MF1, MF2 for supporting at least one tube T that is connected to the port 24 or included in the pouch 2 as an extension defining the port 24. The tubing holder, including the fixation means MF1, MF2, may be distributed at at least two spaced locations along a side of the frame 15, in a peripheral area of the system 1.

The frame 15 may be provided with clamp members and/or grooves G9 (see FIG. 11) for holding one or two hoses/tubes T (see FIG. 10B) that are connected to the pouch 2 via the port(s) 24, thus forming a tubing holder. Such tubing holder has holding parts distributed on at least two or three profiles 92, 93, 94 and optionally one or two corner sections 15c. Here, one or two profiles that are arranged perpendicularly to the front profile 92 include a part of such holding means, for holding the hoses T, above the protecting body 12 in preferred options. Depending on ease at accessing the top or bottom of the protecting body, the tubing holder may also extend below the protecting body 12 in some variants, using a groove G9 arranged below the protecting reference plane P.

It is understood that the tubing holder is arranged entirely outside the cavities CP, in order to not interfere with the peripheral margin 80, thus not interfering with liberty of motion of some of the positioning members PM. When groove G9 is provided in the longer profiles 92, 94, the groove G9 may be substantially as long as the flexible pouch 2 and/or as long as the space delimited between the opposite transverse profiles 91, 92. This allows flexibility in positioning fixation means MF1 provided with an anchoring piece using the groove G9.

In a first option, fixation means MF1 of the tubing holder include one or more anchoring pieces having an anchoring relief 160, as apparent in FIG. 11, having a complementary in shape with respect to the receiving groove G9 of one of the longer profiles 93, 94. Each anchoring piece may also be provided with an abutment end 162 in contact with a surface (here a substantially vertical surface) of the inner section 15a. The anchoring piece may extend upwardly from a joint part joining anchoring relief 160 and the abutment end 162, such joint part being optionally a hollow part or recessed part to improve deformation of the anchoring relief that may be clipped in the groove G9. Here the anchoring pieces are inclined (inwardly) with respect to Z direction. There is no overlapping of the sample unit SU with respect to the frames 93, 94, which may be useful for easily positioning feet 115 or similar vertical posts, allowing superimposing two systems 1 without interference with attachment/detachment operations of the sample units SU.

In variants, the anchoring piece may be either fitted or screwed in a female part included in the profile 93 or 94, or provided with the female part end cooperating with a male part of the profile 93 or 94. This is preferably a removable attachment.

Typically, the anchoring piece may further include, at an upper end thereof, a fastening member 147 for holding the sample unit SU parallel to the frame 15, thus substantially parallel to the reference plane P in illustrated embodiments. The single piece construction of such fixation means MF1 simplifies the mounting steps. It may also be of interest for receiving more than one component, especially when also having a sample unit SU supported by the fixation means MF1 whose positioning is easily adjustable in length along a profile 93 or 94. Other suitable fixation means may be used for removable attachment of an anchoring piece to the frame 15, such anchoring piece functioning as a fastening member to the frame 15.

In some options, the anchoring piece or similar holding piece is not used for attaching the tube T and may only serve as a fastening member 147 or 148.

It can be seen that the sample unit SU is attached above the two longer profiles 93, 94, at a distance from the rear corner section 15c, while being also attached at one or more fastening members 146 arranged at the rear end of the frame 15. In some options, such additional fastening members may be formed near a protecting body rear end, typically outside the peripheral margin 80.

Referring to option illustrated in FIGS. 4C and 6E, the hose/tube T may be simultaneously be received and/or guided in:

the groove G9 (in a part of the groove G9 away from the rear profile 91 and close to the front profile 92), and the blocking groove BG of the anchoring piece.

This of interest to have a compact arrangement of the whole system 1, with the outer circumference of the system only delimited by the profiles, here by the outer sections 15b of the frame 15, efficiently acting as a protection for the pouch 2, which is already sandwiched between the two plates 12A, 12B.

The fixation means MF1 are easily removable, as a simple rotation of the anchoring piece may be sufficient for unclipping this piece from the groove G9. There is no need for tool for removing the hose/tube T from the guiding groove G9 as the tube end is already available/outside thus groove G9 by being clipped in the blocking groove BG which is very short as compared to the elongated groove G9.

Referring to FIGS. 6A-6B and 7, the fixation means MF1, MF2 may comprise at least one fixing element 110 that can be snapped on the frame 15, here by engaging on the outer part of the rail-like profile of the frame 15. For instance, the fixing element 110 is a bracket that partly surrounds a receiving profile, which may be one of the longitudinal profiles 93, 94 or another profile 91, 92. Here, the fixing element 110 is a single piece made of plastic material, having an interior face F110 that may locally match with the outer face F94 of the corresponding profile 94. The fixing element 110 can be engaged at the opposite from the open side of the profile.

The fixing element 110 is here C-shaped or U-shaped in a section view, thus forming a bracket having an almost closed interior face F110. The bracket delimits an interior space or recess for accommodating a portion of the profile 94. Two opposite rims 110b are projecting/protruding towards each other from opposite parallel parts of the interior face F110, in order to narrow the open side of the bracket, as illustrated in FIG. 6B. The two opposite rims 110b are retaining rims, in contact with the inner side face of the receiving profile, so that the fixing element 110 is prevented from moving outwardly relative to the receiving profile, which is here the profile 94.

A protruding pin 110a may be provided in this piece (or vice versa in the receiving profile), in order to form an inwardly protruding indexing member. The fixing element 110 also comprises a clamping part 113, forming a receiving cavity delimited by a concave inner surface 113a. A portion of the tubing outer wall, which may be cylindrical, can be inserted and fitted in this receiving cavity. The portion of the tube T received in one or two cavities of the fixing element(s) 110 may extend entirely above the plane XY when the protecting body and the pouch 2 extend horizontally.

As compared to the recess for accommodating the profile portion, the cavity delimited by the surface 113a may be shifted inwardly. The more the flexible tube T is away from the periphery of the system 1, the lower is risk for accidentally handling and disconnecting this hose or tube T, during transportation steps for instance. But, this tube T remains here easily available for operators.

Referring to FIG. 6B, the pin 110a may extend parallel to Z-direction and protrudes from the interior face 110. This pin 110a or similar indexing member, and the clamping part 113 or similar part for holding tube T, may be provided on same C-shaped or U-shaped branch of the element 110. More generally, the indexing element is provided on the interior face F110, while the part 113 for holding the tube T extends oppositely from an outer face of the fixing element 110.

The pin 110a is received in a recess or aperture of the receiving profile, such recess or aperture opening outwardly. A pair of two opposite recesses 94a, 94b may be provided at same longitudinal position (position as considered along the X-direction) of the profile 94, so that a recess 94a or 94b is always available, whatever the relative position of the tube T is relative to the frame 15.

When engaged in the recess 94a or 94b, the pin 110a prevents sliding (longitudinal sliding) of the fixing element 110 relative to the receiving profile of the frame 15. In variants, other means, for instance a gripping surface with small reliefs, may be used to prevent slipping or sliding of the bracket or similar element 110.

The tubing holder may be an assembly for holding two tubes T, in order to be symmetrically arranged with respect to the longitudinal direction X (i.e. pouch longitudinal axis A). Each symmetrical part is able to hold one hose/tube T.

While FIGS. 4 and 6A show each a solution for horizontal storage, it is understood that the pouch 2 can also be stored vertically or along any suitable direction, thanks to a storage unit 10. A sliding structure may be used for having the protected pouch (in frozen state) carried by an annular frame or similar holding means that can extend vertically for storage purposes.

Of course, the fixing element 110 such as shown in FIGS. 6A-6B can be used in options where the frame 15 comprises or hold one or more fastening members 146, 147, 148 for maintaining the sample unit SU and the bag 2' thereof above the storage unit 10, parallel to the protecting body reference plane P.

Filling of the Pouch

Several flexible pouches 2 may be filled and protected in systems 1 such as illustrated in FIGS. 4 and 6A. A shell may be formed with several superimposed systems 1. The flexible pouches 2 in these systems 1 can be frozen, thawed, filled or emptied simultaneously when they are stored on such kind of shell device. When the flexible pouches 2 are stored, the biopharmaceutical fluid/composition Q can be frozen or thawed. When the flexible pouches 2 are shipped, most often, the biopharmaceutical composition Q is thawed even if the biopharmaceutical fluid can as well be frozen.

The flexible pouch 2 can inflate during filling operation, which means that the circumference of two main walls W1, W2 as considered in the pouch plane (corresponding to the protecting body reference plane P) is decreasing due to inward movement, also known as shrink stroke, of the different sides. Here, in horizontal configuration of the system 1 as illustrated in FIG. 4 or 6A, four pouch sides can be displaced inwardly due to the vertical expansion (along Z-axis).

Referring to FIGS. 1-3, the pouch expansion is limited and controlled by the protecting body 12, 112, due to lower flexibility of the material of the two plates 12A, 12B, optionally provided with outer ribs. The protecting body 12, 112, 212 is made of a freeze resistant polyester or copolyester material that is not brittle at about 25° F. or −4° C. This material is for instance PET or a robust copolyester of TRITAN™ type.

In some options, the peripheral margin 80 is regularly covered by positioning members PM that are simply plugged onto a respective receiving part including elements of the attachment system 18. For instance, two boss portions B12 protruding along Z direction and two boss portions B12' protruding in reverse direction along Z direction are forming a group of four boss portions of a same receiving part cooperating with an elongated positioning member PM.

The attachment device or system 18 comprises one or more cross members or such boss portions B12, B12', which are configured to maintain the positioning members PM in an assembled state. In some options, such cross members may include an insert piece IP (FIG. 7A) and associated fastening lock (for instance a mechanical lock such as nut, bolt or the like). Referring to FIG. 6B, such cross members are engaged with a retaining effect through the hole 18o that matches with slots or apertures 102 provided in the plates 12A, 12B.

The cross members are part of attachment means, which may be in a locking state. In the locking state, the cross members cannot move or slide along Z-direction through the protecting body 12, 112, 212, in order to prevent vertical separation of the parts, UP, LP of the positioning members PM. The same may optionally apply when having boss portion B12, B12' instead of cross.

Referring to FIG. 7A, the upper part UP and the lower part LP are sandwiching the peripheral margin 80, typically in an area that is outside the sandwiching of the pouch 2. FIG. 7A illustrates initial position of the positioning members PM, in empty state of the pouch 2. A Gap is provided between each of the parts UP, LP and the inner side or inner section 15a of the corresponding receiving profile, so that shrink is allowed.

Referring to FIG. 7B, it can be seen the biopharmaceutical composition Q has been introduced in the flexible pouch 2 and each of the positioning members PM can be displaced inwardly, possibly in a final position, in which the positioning member PM is abutting inwardly against abutment rims BS, BS2 of the frame profile. Each of the parts UP and LP may include a front protruding portion 7, 7' that engages/extends through the inner side (elongated) opening of the profile, in a filled configuration of the pouch 2. Each front protruding portion 7, 7' of these parts UP, LP may have a slanted surface reaching the pressing face in contact with the protecting body 2, in order to form a V-like section groove GS (distributed on both sides of the body peripheral margin 80) that opens inwardly. This groove GS may guide the expansion of the protecting body near the peripheral margin 80, in order to prevent direct contact of the surfaces S, S' against the frame 15 (thus preventing any contact against any profile edge/surface). This of interest for protecting the protecting body material, as the profiles 91, 92, 93, 94 are typically in more rigid material, for instance steel, metal or rigid plastic.

The two plates 12A, 12B are flexible enough to allow the protective body 12 to locally have a thickness, in or near a central area, which is greater than in a circumferential area. Thus, when the biopharmaceutical fluid is frozen, the containing region/receiving part 2r or useful part of the flexible pouch 2, i.e. inner region relative to the peripheral seal J, may be slightly curved. Hence, a dimension on the longitudinal direction (X) of the protecting body 12 slightly decreases. In this case, the biopharmaceutical fluid is slightly constrained by the two plates 12A, 12B.

Particular Embodiment with a Casing for Storing the Sample Containing Bag

Referring to FIGS. 5A-5B, the bag 2' may be optionally provided with hoses 104a, 104b and clamps, here two clamps associated to two hoses 104a, 104b. Any one of the hoses 104a, 104b may be formed as closable tube to allow the bag 2' to be filled or emptied. Each clamp respectively pinches one hose 104a, 104b at a straight angle. One or more crimping rings CC are also provided, for instance between the clamp and a port 24' of the bag 2'. All these components may be contained, with the bag 2', in the inside volume V3 of the casing 130.

The inside volume V3 is delimited by the side wall 131 of the casing 130 and extends between a bottom of the casing and a lid 35. The lid 35 is here a hinged lid, connected to the side wall 131 by a hinge H35 that is typically a linear hinge. In closed state, the lid 35 may be locked thanks to snap buttons 35c cooperating with an annular frame formed at or adjacent to an annular end of the side wall 131 (i.e. at the opposite from the casing bottom). More generally, the casing 130 may be provided with a closure system allowing locking and unlocking the folded-down position of the lid 35, such closure system preferably extending at the opposite from the hinge H35.

Typically, the lid 35 cannot be separated from the other walls of the casing, due to the hinge-connection. The fastening elements 132, 133, 134 may be formed as arms or similar extensions protruding outwardly from the side wall 131. The lid 35 thus can be open and closed without interfering with the fastening elements 132, 133, 134 that extend around an annular seat for receiving an annular contact part of the lid 35. The annular contact part surrounds a central covering region of the lid 35, which covers the top open face delimited by the side wall 131.

In embodiments of FIGS. 4 and 10A-10B, the casing 130 is maintained at a vertical distance from the storage unit outer surface, i.e. from the protecting body 12, 112. One or more snap buttons, clips and/or similar removable fasteners, distributed on different sides of the frame 15, are forming the anchoring members of a casing fastening assembly.

Referring to FIG. 10B, it can be seen that one part of the fastening members, here the fastening members 147, 148, are formed by additional pieces, mounted on the frame 15 and extending upwardly from a joining part (for junction to the frame) to an upper fixing end cooperating with openings 136 or similar attachment parts provided in the fastening elements 132 (see FIG. 5A). Another part of the fastening members, here the fastening members 146 are formed in the frame 15 and extend not as high as the fastening members 147, 148. This difference in height level is compensated by one or more elongated tabs forming the fastening element(s) 132, with each fastening element 132 being flexible and able to be inclined downwardly to reach the fastening members 146.

More generally, the fastening elements 132, 133, 134 may be each made of plastic material more flexible than the plates 12A, 12B. Respective apertures 136 and 137, 138 may be provided at each of the fastening element 132, 133, 134, in a distal position with respect to the side wall 131. Such apertures 136 and 137, 138 provided in a region made of flexible material may easy cooperate with corresponding protrusions provided in the frame 15 and/or on a top storage unit outer surface.

In some options, at least two arms or tabs extending in opposite directions from the casing 130 are forming fastening elements 133, 134 that can be inserted through the profiles 93, 94, for instance by sliding in grooves or similar recesses of such profiles 93, 94. Another fastening element 132 may be then fastened to a corresponding fastening member 146' formed on the protecting body 12. Such fastening element 132 may possibly prevent or limit further sliding, thus substantially locking the final attached position of the sample unit SU. More generally, the casing 130 may be attached by sliding all or part of the fastening elements 132, 133, 134 into the frame 15. The frame 15 may be provided, for instance in the two profiles 93, 94, with two longitudinal grooves or similar slide portions that extend parallel, above the protecting body 12 and above any elongated opening in the inner section 15a for passage of the peripheral margin 80.

In some options, at least two arms or tabs extending in opposite directions from the casing 130 are forming fastening elements 133, 134 (see FIG. 5A) that can be inserted through the profiles 93, 94, for instance by sliding in grooves or similar recesses of such profiles 93, 94 (with the grooves possibly open at an axial end). Another fastening element(s) 132 may be then fastened to a corresponding fastening member 146' formed on the protecting body 12 or to a corresponding fastening member 146' formed on a frame end. Such fastening element 132 may possibly prevent or limit further sliding, thus substantially locking the final attached position of the sample unit SU.

Here, there is an optional part of the bag 2', which is flat and does not comprise any biopharmaceutical fluid: it may form a handle. In the non-limiting embodiment of FIGS. 5B and 6A, the casing 130 is affixed to the storage unit outer surface by one or more snap buttons, forming the anchoring members (136, 137, 138, 146', 147', 148') of a casing fastening assembly. Here, a rear longitudinal edge of the bag 2', which is part of the handle, is illustrated as extending outside the casing 130, by protruding between the lid 35 and the casing frame. However, in preferred options, the bag 2' can be housed entirely inside the casing 130.

In options using anchoring protrusions or other anchoring parts of the protecting body, any positive locking may be provided to have the casing 130 directly attached to the outer surface S, which is here an upper surface of the protecting body 12, 112, 212. Similarly, any positive locking may be provided, in order to have the casing 130 attached to the frame 15 by extending as close as possible (but typically with a small spacing gap) from the outer surface S.

While the casing 130 is here parallelepiped, its side wall 131 may be of any prismatic shape with or without rounded parts.

Besides, the side wall 131 of the casing 131 may be provided outside the corner regions CR of the protecting body 12, 112, 212 and/or kept at a distance greater than 120 mm from the peripheral margin 80 (i.e. from the reference plane). In embodiment of FIG. 6A, the casing 130 may be kept attached to a backing region that remains substantially planar during filling/thawing operations.

The casing 131, considered as a whole, is of a thickness lower than maximal thickness of the flexible pouch 2 in filled state. This also applies a fortiori for the bag 2'. For instance, the casing 131 has a thickness (measured along Z-direction) that is inferior to 50 or 60 mm. The casing whole thickness may be inferior to distance along Z direction between the reference plane P of the protecting body and the casing 130.

The fastening elements 132, 133, 134 may only extend, from the side wall 131, toward directions away from the middle (away from center C) of the protecting body 12. All the interlocking or anchoring members 136, 137, 138 provided in the fastening elements 132, 133, 134 are configured to be in contact with the surface S at more than 200 or 500 mm, from the center C of the protecting body 12 (center where the diagonals DL1, DL2 intersect).

Besides, it can be seen that the fastening elements 132, 133, 134 entirely extend above the protecting body, so that they are not overlapping sides of the frame 15. The fastening elements thus may be relatively short straps or tabs, so that sample unit maximal extension in width or length cannot exceed width of the frame 15.

Details of exemplary embodiments for controlling pouch expansion

In embodiment of FIG. 8, the plate dimension reduction (as considered in XY plane) is obtained with a profile of shrink strokes, such reduction being adjusted to be different, depending on longitudinal positions of some positioning members PM that locally prevent or limit such dimension decrease, for a control of the shrink stroke.

Here, the positioning members PM (which are secured to the peripheral margin 80 as illustrated in FIGS. 7A-7B) are distributed longitudinally and some of them are configured to limit shrink stroke of the longitudinal sides of the protecting body by a stopping effect due to engagement of the positioning members PM against the interior surfaces of the abutment rims BS, BS2.

Figure 9A:
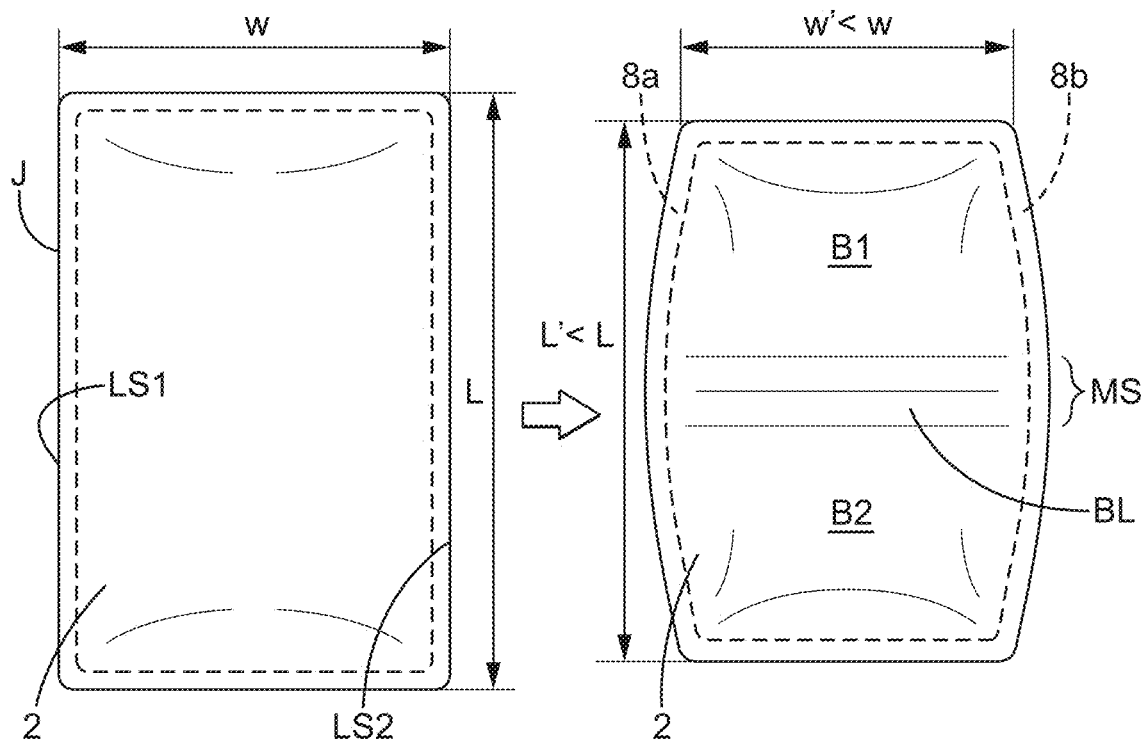
FIG. 9A is a top view of the flexible pouch filled with liquid inside the system of FIG. 8 without illustrating the protecting body and the positioning members.

All or parts of the positioning members PM are stoppers for providing strokes limitation between the stoppers 41, 41' 42 and the abutment surfaces BS, BS2 included in the frame 15 of the holding and retaining assembly HR. Referring to FIGS. 8 and 9A, the stoppers 41, 41' arranged at or near a middle section MS of the pouch 2 are involved to create a belt effect. In some embodiments, such belt effect is separating two bellies or bulges B1, B2.

Figure 9B:
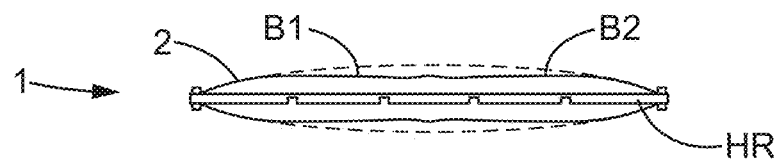
FIG. 9B is a side view showing a frame-like holder and the flexible pouch filled with liquid inside the system of FIG. 8 without illustrating the protecting body and the positioning members.

Referring to FIGS. 8 and 9A-9B, the positioning members may act as stoppers 41 or 41' only in the two intermediate parts 82 of the protecting body 12. As a result, since stroke is allowed in regions closer to the corner regions CR, here in the end parts 81, the pouch 2 covered by the containment protecting body 12, 112 or 212 cannot form a single belly or bulge in the middle thereof.

Moreover, the optional ribs prevent the plate outer surface from forming fold lines or hollows that limit good filling of the biopharmaceutical composition Q in the corner region. Such ribs, possibly with regions or portions of lower height (for instance only at the diagonal lines DL1, DL2 as guiding and accordion-like effect is already obtained along the four sides of the rectangular shaped protecting body 12, 112) may help in expanding the protecting body 12, 112 from the inside without creating hollows or inappropriate fold lines detrimental to filling at the corner regions CR.

It is understood that at a given level of filling, the pouch corners and protecting body corners can continue to move inwardly during filling operation, while the intermediate parts 82 are blocked by the stoppers 41, 41'. At the corner regions CR, shrink strokes are longer than in the middle and will allow storing at least the same liquid capacity than without the belly/bulge retention.

Still referring to FIG. 8, the stoppers 41, 41', 42 may be at predefined positions, in order to form positing members PM. Here, only the stoppers 41, 41' that are located away from the end sides 120a, 120b have a relatively closer distance to a median symmetry plane of the protecting body 12, as compared to distance for the stoppers 42. In such option shown in FIG. 8, such stoppers 41, 41', 42 follow displacement (shrinking) of the peripheral margin 80.

During filling operation, as the stoppers 41, 41' provided in intermediate parts 82 of the longitudinal margin potions 8a, 8b are (initially) shifted inwardly due to arrangement of the attachment system 18 and/or due to a unsymmetrical disposition of the positioning members, and because the abutment surfaces SB, SB2 are in alignment, parallel to the X direction, these stopper 41, 41' are in abutment state against the abutment surfaces SB, SB2 well before the stoppers 42 adjacent to/facing a corresponding corner region CR. A belly retention effect at the middle of the protecting body 12, 112 is obtained.

In options, ribs R1, R2, R3, R4 are provided in the plates 12A, 12B, possibly with corner ribs C1, C2 having a decreasing height profile toward the intersection region with the diagonals DL1, DL2. In such kind of option, the retention effect (decreasing bulge effect in the middle region MR, near the center C) is completed by a regular expansion of the regions around the panels PP or PP1, PP2, preventing undesirable formation of pronounced fold lines.

Of course, FIG. 8 is only an exemplary embodiment for managing the shrink of the plates 12A, 12B. More generally, the protecting body 12 can be mounted to sandwich the flexible pouch 2 and may be received/hold in an interspace of any suitable holding and retaining assembly HR, which is rigid and delimits an outer circumference of the system 1. Depending on level of filling of the pouch 2 sandwiched by the plates 12A, 12B, the protecting body 12 may comprise one or more areas of maximum thickness. In order to accommodate this thickness variation, the holding and retaining assembly HR may be of annular shape.

The one or more bulges/bellies B1, B2 as illustrated in FIG. 9A-9B can be formed due to the expansion control and early stopping effect at the intermediate parts (thanks to the early blocking stopper 41 and/or 41' for instance), so that the middle section MS is much less moved as compared to complementary sections covered by parts of the protecting body 12 that are near the first and second end sides 120a, 120b.

More generally, any configuration with positioning members able to form stoppers away from the corner regions CR may be provided, so that a higher constraining effect can be obtained in a center of the pouch 2, as illustrated in FIGS. 9A-9B in particular. This is of interest for managing freeze/thaw operations of biopharmaceutical materials contained in the pouch 2. This is also of interest to better stack the systems such as illustrated in FIGS. 4 and 6A, with higher compactness (less vertical space between two adjacent storage units 10), thus offering opportunities to store more pouches 2 in a freezing chamber.

Dashed lines in FIG. 9B show the kind of belly usually obtained when similarly allowing a significant stroke in each region of the peripheral margin 80. It is thus of interest to limit or prevent the displacement of the middle part of the protecting body 12, 112, 212, in order to limit accumulated mass (of important thickness) that could be difficult to be thawed.

FIG. 9A shows that the frame 15 or any kind of holding part of the assembly HR is suitable to allow the protecting body 12, 112, 212 to change its conformation (with decrease in body width and in body length), thus allowing reducing:
the pouch 2 in width (with w'<w, where w' is the pouch width in filled state, as compared to pouch width w in empty state), and
the pouch 2 in length (with L'<L, where L' is the pouch length in filled state, as compared to pouch length L in empty state).

In some variants, the positing members PM may be positioned in through slots and maintained stationary, for instance by being secured to or integral with the rigid frame 15 or similar holding and retaining assembly. The slots in the protecting body may be of greater size only near the end sides 120a, 120b, thus allowing greater shrinking only at the corner regions CR and preventing forming a too great bulge near the center C (due to belly effect/retention in the intermediate parts where the positioning members are early stopping members).

The holding and retaining assembly HR may comprise at least three positioning members PM distributed on each of the longitudinal sides 120c, 120d, with typically one or two central stoppers 41 corresponding to the positioning members PM arranged away from the corner regions CR.

Additionally or independently of having such belly retention effect, each system or at least one of a system amongst a stack of systems may be provided with a sample unit SU including the bag 2' where a small amount representative of the biopharmaceutical composition Q can be stored. At thawing stage, it may be of interest to have a sample unit SU providing a small amount of biopharmaceutical composition Q that has be submitted to same treatments, same freezing operations as the composition contained in the large capacity pouch 2. A small amount is faster to be heated, making the thawing operation quick for the content of the sample unit SU.

The system 1 is well adapted for freezing, storing and thawing biopharmaceutical materials contained in a flexible pouch 2 of simple conception. A storage unit 10 as above described may be protected without interfering filling and expansion of the pouch 2, by a compact peripheral part. Such peripheral part or frame-like structure is of interest for at least one of the following reasons:
having a sample unit SU available without complex handling, at same location as the pouch (in the space typically delimited by the frame 15),
having a sample unit SU efficiently fastened (mechanically fastened in some embodiments, typically without apertures/significant protrusions or without creating defects in the protecting body) for withstanding a large range of temperatures (without chemical bounding or using adhesive effect), preferably without accessories or bulky intermediate fixtures,
conditioning the biopharmaceutical composition Q with a high level of protection, with optimized bulk.

In embodiments with the adjustable positioning members PM, the filling of the pouch 2 may be performed with a controlled and restricted expansion, so that expansion is restricted in one or more areas where the fluid thickness would reach a maximum if no expansion control is carried. The interior volume or cavity delimited by the main walls W1, W2 is expanded with prevention of free expansion in the middle areas of these walls W1, W2. Especially expansion can be limited along one or more belt line BL that joins the two intermediate parts 82, as illustrated in FIG. 9A.

Depression along such belt line BL, due to the low or inexistent shrink stroke in the intermediate parts 82, typically creates at least one recess. In the pouch 2 as filled and in containment configuration of the storage unit 10, at least one recess is thus created in the filled pouch 2 between the two bulges B1, B2. This allows a generally equal distribution of fluid, as a more uniform thickness distribution is obtained, without decreasing the capacity of the pouch 2.

The pouch 2 and the protecting body 12 may be exposed to a temperature of about −70° C. or lower to freeze the biopharmaceutical fluid/composition Q. The annular shape of the frame 15 of the holding and retaining assembly HR is of interest to provide a recessed area where cold air can circulate and flow between systems 1 (even if they are staked). But other shapes and structures may be used to form a holding and retaining assembly for a controlled expansion, in order to:
eliminate or reduce the formation of too significant projections during freezing,
allow affixing a sample unit SU parallel to the substantially flat protecting body 12, 112, 212, whatever level of filling is reached for the pouch sandwiched by the plates 12A, 12B.

The present invention has been described in connection with the preferred embodiments. These embodiments, however, are merely for example and the invention is not restricted thereto.

Of course, the pouches 2 of the present invention are not in any way limited to pouches having four sides and/or pouches that are larger than wide. The pouches 2 may have other shapes provided with two generally parallel sides, covered by the pair of plates 12A, 12B or similar protecting body including two flat portions. While each plate 12A or 12B is illustrated as a one-piece element, options are available for combining two or more flat containment pieces able to restrict expansion of the pouch 2, while being more or less displaceable for adjustment of the shrink stroke.

It will be understood by those skilled in the art that other variations and modifications can easily be made within the scope of the invention as claimed.

For instance, while the fastening elements 132, 133, 134 have been illustrated as being extension parts of the casing 130, one or more of such fastening elements may alternatively be included in tabs or extensions integral with the bag 2'. A protection layer or outer envelope integral with the bag 2' (i.e. outer envelope covering or wrapping the envelope of the bag 2' in contact with the product) may be optionally provided, in addition or in replacement of the casing 130.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A freeze/thaw containment system for containing a biopharmaceutical composition, comprising:
a flexible pouch of a first capacity, configured to contain the biopharmaceutical composition;
a storage unit for use in freezing, storing and thawing the biopharmaceutical composition contained in the flexible pouch;
a bag of a second capacity, configured to contain a composition representative of the biopharmaceutical composition, the second capacity being lower than the first capacity; and
a casing delimiting an inside volume for housing the bag in a filled state of the bag;
wherein the storage unit comprises:
a protecting body comprising two plates for protecting the flexible pouch, the protecting body comprising a longitudinal axis and having four sides, the four sides comprising two longitudinal sides extending parallel to the longitudinal axis and two other sides that include a first end side and a second end side each perpendicular to the longitudinal axis, and
an attachment device for fastening the two plates so that in an assembled state of the two plates, the protecting body comprises a peripheral margin that extends annularly in a protecting body reference plane, the peripheral margin being provided with at least one opening able to receive at least one port of the flexible pouch, wherein the system further comprises a rigid peripheral part, adjacent to or overlapping the peripheral margin, the rigid peripheral part being provided with a mounting set comprising three separate supporting members for supporting the protecting body,
wherein in the assembled state:
the protecting body extends planar in an empty state of the flexible pouch, along the protecting body reference plane; and
the two plates respectively form a lower surface and an upper surface of the protecting body, at least one amongst the lower surface and the upper surface being a storage unit outer surface;
and wherein the casing comprises at least two fastening elements cooperating with fastening members included in one amongst the mounting set and the storage unit outer surface, in order to have the casing fastened along the storage unit, generally parallel to the protecting body.

2. The freeze/thaw containment system according to claim 1, wherein the two plates are flexible enough to allow the protecting body to have a thickness in a central area greater than in a circumferential area, in reference to the protection body reference plane, the thickness being measured between the lower surface and the upper surface along a direction perpendicular to the protection body reference plane.

3. The freeze/thaw containment system according to claim 1, wherein the flexible pouch is directly sandwiched between the two plates which constrain the flexible pouch.

4. The freeze/thaw containment system according to claim 3, wherein, the two plates are two pieces.

5. The freeze/thaw containment system according to claim 1, wherein the fastening members are distributed: in a first region adjacent to a first side of the two longitudinal sides,
and in at least one second region located away from the first side.

6. The freeze/thaw containment system according to claim 1, wherein the rigid peripheral part is a frame having a top face extending above the protecting body and a lower face extending below the protecting body,
wherein the casing is removably secured to the mounting set, the mounting set extending around three sides of the flexible pouch, the fastening members comprising:
two fastening members, distributed on the two longitudinal sides, the two fastening members extending entirely above the protecting body and away from the two other sides; and
at least one fastening member integrally formed with one of the three separate supporting members or with a corner section interconnecting two of the three separate supporting members.

7. The freeze/thaw containment system according to claim 1, wherein the fastening members, distributed on a frame that includes the three separate supporting members, are configured for interlocking of the casing.

8. The freeze/thaw containment system according to claim 1, wherein two of the fastening members are formed integrally with two separate corner sections, in order to be distributed on a frame around the flexible pouch.

9. The freeze/thaw containment system according to claim 7, wherein the casing has a prismatic shape.

10. The freeze/thaw containment system according to claim 8, wherein the casing has a parallelepiped shape and is provided with:
a casing frame delimiting a casing opening for access to the inside volume of the casing; and
a lid configured to close in removable manner the casing opening.

11. The freeze/thaw containment system according to claim 1, wherein the bag is part of a bag unit that includes one or more openings or ports, at least one of which being formed as closable tube to allow the bag to be filled or emptied, and wherein the bag and said closable tube are stored in the inside volume of the casing.

12. The freeze/thaw containment system according to claim 10, wherein the bag is part of a bag unit that includes one or more openings or ports, at least one of which being formed as closable tube to allow the bag to be filled or emptied, and wherein the bag unit is housed in the inside volume in a closed state of the lid.

13. The freeze/thaw containment system according to claim 7, wherein the casing has a lower face that:
is facing the storage unit outer surface, and
extends parallel to the protecting body reference plane in an empty state of the flexible pouch.

14. The freeze/thaw containment system according to claim 7, wherein the casing is made of one piece of transparent plastic material.

15. The freeze/thaw containment system according to claim 1, wherein the casing comprises:
a side wall delimiting the inside volume; and
two opposite tabs that have each a base connected to the side wall, each of the two opposite tabs being part of the fastening elements.

16. The freeze/thaw containment system according to claim 1, further comprising:
a tube connected to the flexible pouch and configured for flowing liquid of the biopharmaceutical composition;
a tubing holder for holding the tube; and a frame provided with four sides, forming the rigid peripheral part, the frame intersecting and extending parallel to the protecting body reference plane, the frame being configured to hold the protecting body, directly or indirectly, at least two profiles being included in the frame to form all or part of the four sides;

wherein the tubing holder comprises at least one fixing element resiliently mounted on one of the at least two profiles and provided with a clamping part for holding the tube.

17. The freeze/thaw containment system according to claim 16, wherein the at least one fixing element is provided with one of the fastening members, which is adjacent to and/or superimposed on the clamping part.

18. The freeze/thaw containment system according to claim 1, wherein the fastening members are formed as coupling pieces of the mounting set and are interposed between:

supporting members of the rigid peripheral part,
and the fastening elements of the casing.

19. The freeze/thaw containment system according to claim 1, wherein the casing fastened along the storage unit has a smaller size corresponding to a casing thickness, measured perpendicular to the protecting body reference plane, the casing thickness being inferior to distance between the bag and the protecting body reference plane.

20. A method of assembling a freeze/thaw containment system as recited in claim 1, which is a protection system for storing and withstanding freezing and thawing of the biopharmaceutical composition contained in the flexible pouch of the freeze/thaw containment system, the flexible pouch being of a first capacity, the method comprising:

sandwiching a flexible pouch between two plates of a protecting body, selectively by a covering portion distributed in the two plates for covering the flexible pouch, the protecting body being configured for protecting the flexible pouch and comprising the two plates, the protecting body further having a longitudinal axis and comprising four sides, the four sides comprising two longitudinal sides extending parallel to the longitudinal axis and two other sides that include a first end side and a second end side each perpendicular to the longitudinal axis;

using an attachment device for fastening the two plates so that in an assembled state of the two plates, the protecting body comprising a peripheral margin that extends annularly in a protecting body reference plane, around the covering portion, the peripheral margin being provided with at least one opening receiving at least one port of the flexible pouch; and providing a casing delimiting an inside volume, a bag in a filled state extending in the inside volume, the bag being of a second capacity and containing a composition representative of the biopharmaceutical composition, the second capacity being lower than the first capacity, wherein the protecting body and the attachment device belong to a storage unit, wherein the assembled state is obtained after configuring the two plates to sandwich the flexible pouch and after affixing the casing to fastening members that belong either to a rigid peripheral part surrounding the protecting body, or to a storage unit outer surface formed by the protecting body, and wherein, in the assembled state, the two plates respectively form a lower surface and an upper surface of the protecting body, at least one amongst the lower surface and the upper surface being the storage unit outer surface, the casing facing the storage unit outer surface and having at least two fastening elements cooperating with the fastening members, in order to have the casing maintained and secured along the storage unit, parallel to the protecting body.

* * * * *